(12) United States Patent
Matsui et al.

(10) Patent No.: US 9,725,943 B2
(45) Date of Patent: Aug. 8, 2017

(54) CONTROL DEVICE

(71) Applicant: AISIN SEIKI KABUSHIKI KAISHA, Kariya-shi (JP)

(72) Inventors: Seika Matsui, Kariya (JP); Kosuke Tsukao, Kariya (JP); Takeshi Katsuda, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/988,793

(22) Filed: Jan. 6, 2016

(65) Prior Publication Data

US 2016/0208540 A1     Jul. 21, 2016

(30) Foreign Application Priority Data

Jan. 15, 2015   (JP) ................................ 2015-005909

(51) Int. Cl.
    B60W 10/00         (2006.01)
    B60W 20/00         (2016.01)
                (Continued)

(52) U.S. Cl.
    CPC .......... *E05F 15/70* (2015.01); *B60R 25/2045* (2013.01); *B60R 25/403* (2013.01); *G07C 9/00174* (2013.01); *G07C 9/00309* (2013.01); *G07C 9/00896* (2013.01); *H04N 5/225* (2013.01); *G07C 2009/00373* (2013.01); *G07C 2209/65* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,116,140 B2 * | 10/2006 | Koch | ................... | H03K 17/302 |
| | | | | 327/143 |
| 8,843,277 B2 * | 9/2014 | Fuchs | ..................... | B60R 25/00 |
| | | | | 340/5.51 |

(Continued)

FOREIGN PATENT DOCUMENTS

JP        2006-344554      12/2006

OTHER PUBLICATIONS

Extended European Search Report issued Jun. 14, 2016 in Patent Application No. 15202879.1.

*Primary Examiner* — Yonel Beaulieu
(74) *Attorney, Agent, or Firm* — Oblon, McClelland, Maier & Neustadt, L.L.P.

(57) ABSTRACT

A control device includes: an input unit to which a first signal is input from a detection unit detecting an operation for an opening-closing body; and a control unit generates a second signal for operating the opening-closing body, based on the first signal, wherein the control unit can be switched between a first power consumption mode and a second power consumption mode in which less power is consumed, and the control unit can be switched between a first state where the second power consumption mode is switched to the first power consumption mode, based on a first condition, and a second state where the second power consumption mode is switched to the first power consumption mode, based on a second condition on which the second power consumption mode is less likely to be switched to the first power consumption mode.

8 Claims, 13 Drawing Sheets

(51) Int. Cl.
*E05F 15/00* (2015.01)
*E05F 15/70* (2015.01)
*H04N 5/225* (2006.01)
*G07C 9/00* (2006.01)
*B60R 25/20* (2013.01)
*B60R 25/40* (2013.01)

(56) References Cited

U.S. PATENT DOCUMENTS

| | | | |
|---|---|---|---|
| 9,446,739 B2* | 9/2016 | Herthan | B60R 25/2054 |
| 2005/0034023 A1* | 2/2005 | Maturana | G06Q 10/06 |
| | | | 714/37 |
| 2008/0307240 A1* | 12/2008 | Dahan | G06F 1/06 |
| | | | 713/320 |
| 2011/0270452 A1* | 11/2011 | Lu | G05B 19/042 |
| | | | 700/291 |
| 2013/0018551 A1 | 1/2013 | Fuchs et al. | |

* cited by examiner

CONTROL DEVICE

CROSS REFERENCE TO RELATED APPLICATIONS

This application is based on and claims priority under 35 U.S.C. §119 to Japanese Patent Application 2015-005909, filed on Jan. 15, 2015, the entire contents of which are incorporated herein by reference.

TECHNICAL FIELD

This disclosure relates to a control device.

BACKGROUND DISCUSSION

In recent years, a technique has been studied in which various operations are performed from an outside of a vehicle by causing a sensor arranged on an exterior side of the vehicle to react to a portion of an occupant's body (refer to JP 2006-344554A (Reference 1)).

However, even when the occupant has no intention to perform an operation, a sensor reacts in some cases. If such an incident frequently occurs when the vehicle is stopped, in some cases, it is conceivable that not only a battery life is consumed but also the battery runs down.

SUMMARY

Thus, a need exists for a control device which is not susceptible to the drawback mentioned above.

An aspect of this disclosure provides a control device including an input unit to which a first signal is input from a detection unit which detects an operation for operating an opening-closing body, and a control unit that generates a second signal for operating the opening-closing body, based on the first signal. The control unit is capable of being switched between a first power consumption mode and a second power consumption mode in which less power is consumed than in the first power consumption mode. The control unit is capable of being switched between a first state where the second power consumption mode is switched to the first power consumption mode, based on a first condition, and a second state where the second power consumption mode is switched to the first power consumption mode, based on a second condition on which the second power consumption mode is less likely to be switched to the first power consumption mode than on the first condition.

According to the aspect of this disclosure, conditions for switching a second power consumption mode to a first power consumption mode can be switched therebetween. Therefore, it is not only possible to prevent the second power consumption mode from being unintentionally switched to the first power consumption mode, but also possible to prevent an increase in total operation hours in the first power consumption mode. Therefore, according to the aspect of this disclosure, power consumption can be reduced, and a battery can be prevented from running down.

BRIEF DESCRIPTION OF THE DRAWINGS

The foregoing and additional features and characteristics of this disclosure will become more apparent from the following detailed description considered with the reference to the accompanying drawings, wherein:

FIGS. 8A and 8B are time charts illustrating an example of an operation detection signal output from an operation detection unit;

DETAILED DESCRIPTION

One Embodiment

Figure 1:
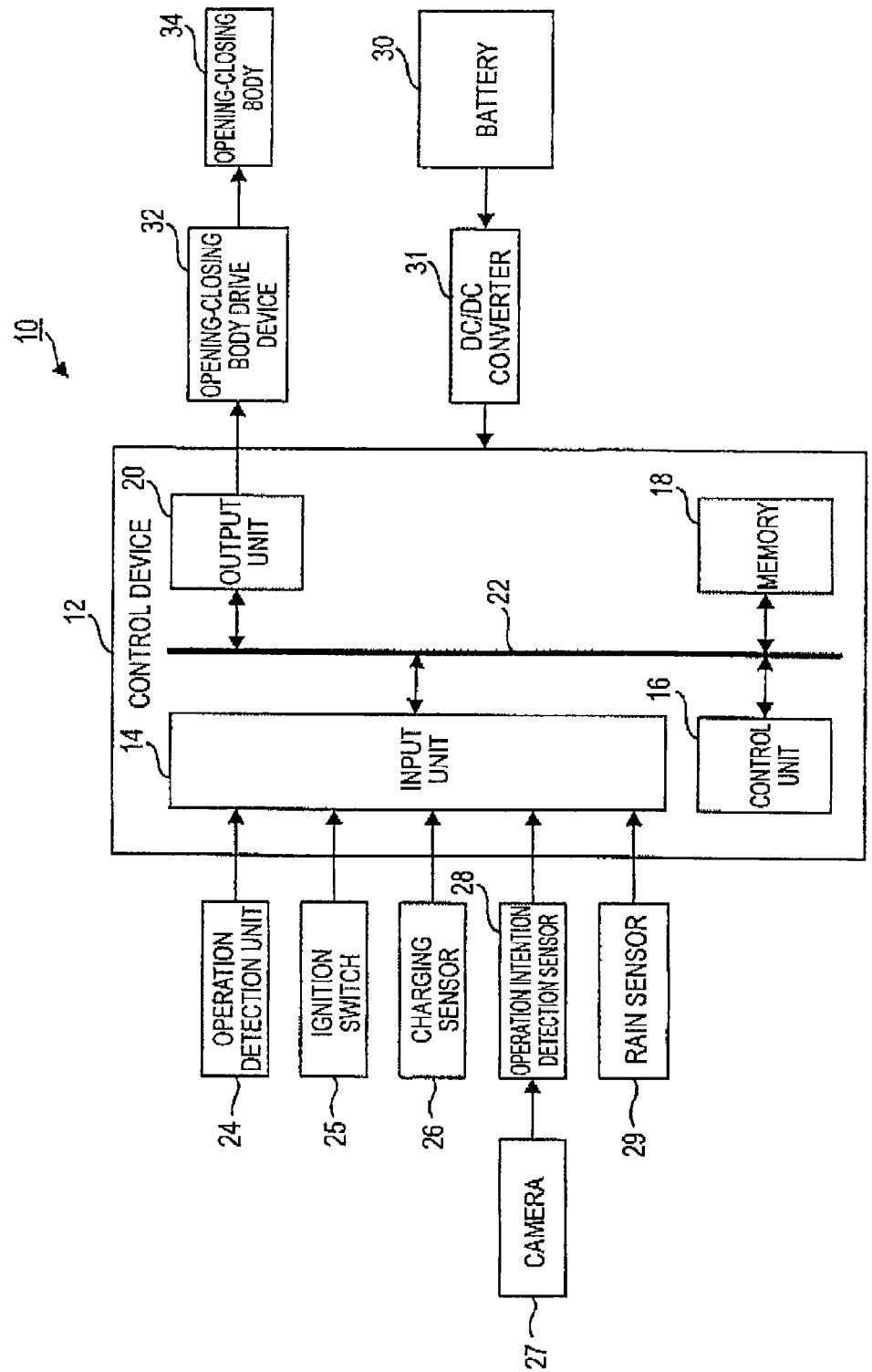
FIG. 1 is a block diagram illustrating a control device and a vehicle control system according to an embodiment disclosed here.
Figure 2:
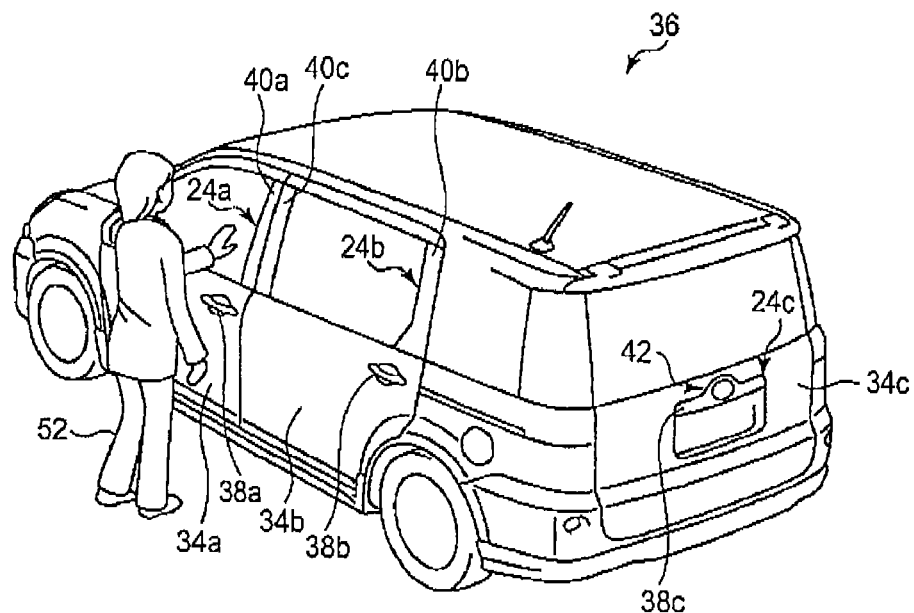
FIG. 2 is a perspective view illustrating a vehicle according to the embodiment disclosed here.
Figure 3:
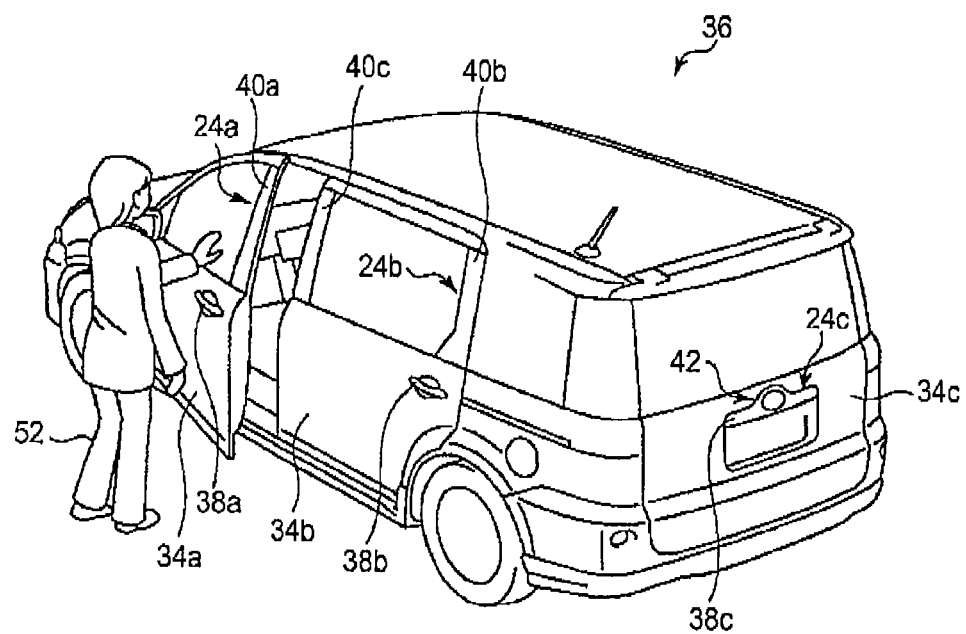
FIG. 3 is a perspective view illustrating the vehicle according to the embodiment disclosed here.
Figure 4:
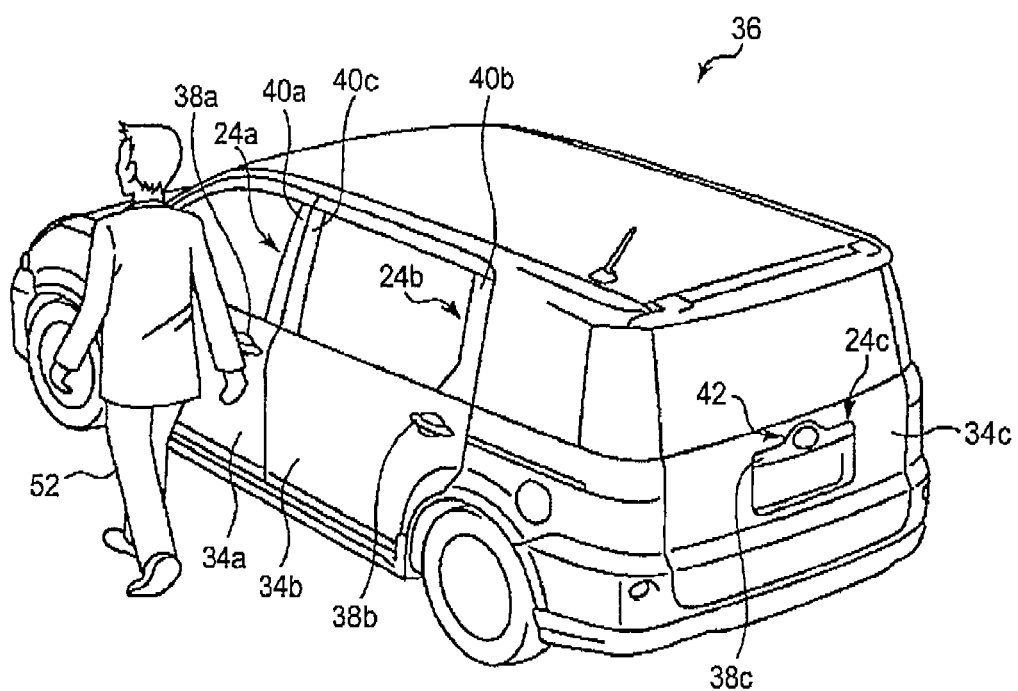
FIG. 4 is a perspective view illustrating the vehicle according to the embodiment disclosed here.
Figure 5:
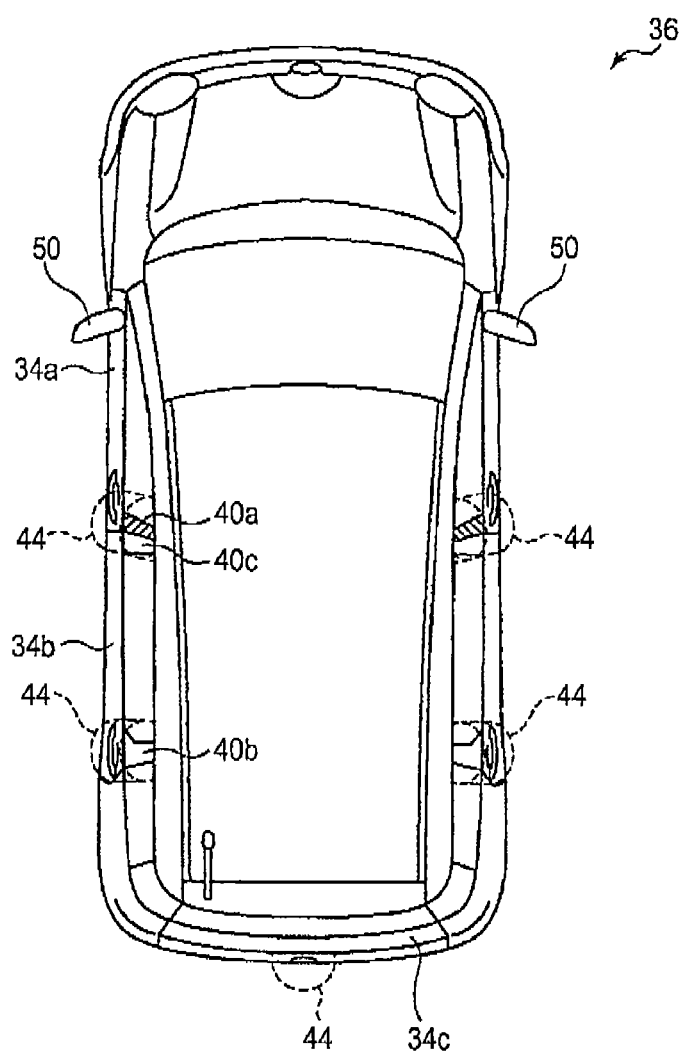
FIG. 5 is a plan view illustrating the vehicle according to the embodiment disclosed here.

A control device and a vehicle control system using the control device according to a first embodiment will be described with reference to FIGS. 1 to 15. FIG. 1 is a block diagram illustrating the control device and the vehicle control system according to the embodiment disclosed here. FIGS. 2 to 4 are perspective views illustrating a vehicle according to the embodiment disclosed here. FIG. 2 illustrates a state where an occupant performs an operation for operating an opening-closing body. FIG. 3 illustrates a state where the occupant performs an opening operation on the opening-closing body. FIG. 4 illustrates a state where a passerby passes by a lateral part of the vehicle. FIG. 5 is a plan view illustrating the vehicle according to the embodiment disclosed here.

As illustrated in FIG. 1, a vehicle control system 10 according to the embodiment disclosed here has a control device 12. The control device 12 has an input unit 14, a control unit (CPU: Central Processing Unit) 16, a memory 18, and an output unit 20. The input unit 14, the control unit 16, the memory 18, and the output unit 20 can mutually input and output a signal via a bus line 22.

An operation detection signal (first signal, detection signal) output from an operation detection unit (detection unit, operation sensor, operation detection means) 24 is input to the input unit 14 of the control device 12. The operation detection unit 24 detects an operation of an occupant (user)

52 for operating an opening-closing body (door) 34 of a vehicle 36. For example, the operation detection unit 24 is disposed in the opening-closing body 34. The opening-closing body 34 is disposed at multiple locations in the vehicle 36. However, in FIG. 1, one of the multiple opening-closing bodies is illustrated by using the reference numeral 34. In FIGS. 2 to 4, a front side door which is one of the multiple opening-closing bodies 34 is illustrated by using the reference numeral 34a. A rear side door which is one of the multiple opening-closing bodies 34 is illustrated by using the reference numeral 34b. A backdoor which is one of the multiple opening-closing bodies 34 is illustrated by using the reference numeral 34c. For example, the side doors 34a and 34b are swing doors. FIGS. 2 to 4 omit the illustration of the side door 34 disposed in the right front part of the vehicle 36 and the side door 34 disposed in the right rear part of the vehicle 36. The operation detection unit 24 is disposed for each of the multiple opening-closing bodies 34. In FIGS. 2 to 4, the operation detection unit arranged in a pillar section 40a of the front side door 34a is illustrated by using the reference numeral 24a. The operation detection unit arranged in a pillar section 40b of the rear side door 34b is illustrated by using the reference numeral 24b. The operation detection unit arranged in the backdoor 34c is illustrated by using the reference numeral 24c.

The operation of the occupant 52 for operating the opening-closing body 34 is performed by using a portion of the body of the occupant 52. For example, the operation performed on the opening-closing body 34 includes an opening operation and a closing operation of the opening-closing body 34. For example, the operation using a portion of the body of the occupant 52 includes the occupant 52 holding up his or her hand over the operation detection unit 24 (refer to FIG. 2). The operation detection unit 24 outputs a signal in response to the operation performed by a portion of the body of the occupant 52, that is, an operation detection signal. For example, a magnitude of the operation detection signal output from the operation detection unit 94 is determined corresponding to the proximity of the portion of the body of the occupant 52. When the portion of the body of the occupant 52 is not sufficiently close to the operation detection unit 24, the magnitude of the operation detection signal output from the operation detection unit 24 is relatively small. On the other hand, when the portion of the body of the occupant 52 is sufficiently close to the operation detection unit 24, the magnitude of the operation detection signal output from the operation detection unit 24 becomes relatively greater. For example, an A/D converter (not illustrated) is disposed in the input unit 14, thereby enabling the control unit 16 to read the magnitude of the operation detection signal output from the operation detection unit 24.

The portion of the body of the occupant 52 which is held up over a site having the operation detection unit 24 arranged therein is not limited to the hand. For example, even when the elbow of the occupant 52 is held up over the site having the operation detection unit 24 arranged therein, the operation detection signal corresponding to how close to the elbow is output from the operation detection unit 24.

For example, as the operation detection unit 24, a proximity sensor can be used. For example, as the proximity sensor, a capacitance-type proximity sensor can be used. For example, multiple proximity sensors (not illustrated) are incorporated into one operation detection unit 24. The reason for incorporating the multiple proximity sensors into the operation detection unit 24 is to achieve improved detection accuracy. When the operation detection unit 24 employs the capacitance-type proximity sensor, a voltage is applied to an electrode of the proximity sensor from the input unit 14 side. Therefore, when the operation detection unit 24 is operated, power is consumed in the control device 12.

In the vehicle control system according to the embodiment disclosed here, the opening-closing body 34 is automatically open to a fully open position, based on the operation performed by the portion of the body of the occupant 52.

For example, a site for arranging the operation detection unit 24a for operating the front side door 34a includes the pillar section (center pillar section) 40a of the side door 34a. Here, for example, the operation detection unit 24a is incorporated in the pillar section 40a of the front side door 34a.

For example, a site for arranging the operation detection unit 24b for operating the rear side door 34b includes the pillar section 40b on the rear side of the side door 34b. Here, for example, the operation detection unit 24b is incorporated in the pillar section 40b on the rear side of the front side door 34b.

For example, a site for arranging the operation detection unit 24c for operating the backdoor 34c includes an emblem section 42 arranged in the backdoor 34c. Here, for example, the operation detection unit 24c is incorporated in the emblem section 42 of the backdoor 34c.

Door knobs 38a and 38b are respectively disposed in the side doors 34a and 34b. A door knob 38c is also disposed in the backdoor 34c.

In FIGS. 2 to 4, a case where the door knobs 38a to 38c are respectively disposed in the doors 34a to 34c has been described as an example. However, the door knobs 38a to 38c may not be disposed in the doors 34a to 34c. The reason is that in the vehicle control system according to the embodiment disclosed here, the doors 34a to 34c can be opened without using the door knobs 38a to 38c.

When the operation detection units 24a and 24b are incorporated in the pillar sections 40a and 40b of the side door 34a, each operation detection area 44 of the operation detection units 24a and 24b is as illustrated by a dashed line in FIG. 5. That is, a fixed range space surrounding the pillar sections 40a and 40b, that is, a fixed range space surrounding the operation detection units 24a and 24b is the operation detection area 44 of the operation detection units 24a and 24b.

When the operation detection unit 24c is incorporated in the emblem section 42 of the backdoor 34c, the operation detection area 44 of the operation detection unit 24c is as illustrated by a dashed line in FIG. 5. That is, a fixed range space surrounding the emblem section 42, that is, a fixed range space surrounding the operation detection unit 24c is the operation detection area 44 of the operation detection unit 24c.

If the operation detection area 44 of the operation detection unit 24 is too wide, erroneous detection increases. If the operation detection area 44 is too narrow, operability becomes poor. Therefore, it is desirable to appropriately select a proper range in view of both aspects such as erroneous detection prevention and operability improvement.

In addition, a signal indicating a state where an ignition switch 25 disposed in the vehicle 36 is turned on or off is input to the input unit 14. The ignition switch 25 is disposed at a location into which an ignition key (not illustrated) of the vehicle 36 is inserted. A state where the ignition switch 25 is turned off can be considered as a state where an engine is stopped. When the engine is stopped, a battery 30 disposed in the vehicle 36 is not charged. Therefore, the state where the ignition switch 25 is turned off can be determined as a state where the battery 30 is not charged. On the other hand, even in a state where the ignition switch 25 is turned on, a state where the engine is not operated may occur. Therefore, whether or not the engine is operated is determined, based on engine rotation information or vehicle speed information. When the battery 30 is not fully charged in a state where the engine is operated, the battery 30 is charged. Therefore, when the engine rotation information indicates that the engine is rotated or when the vehicle speed information indicates that the vehicle speed is not zero, the state can be determined as a state where the battery 30 is charged. The engine rotation information is input from an engine rotation sensor (not illustrated) via the input unit 14, and the vehicle speed information is input from a vehicle speed sensor (not illustrated) via the input unit 14.

A signal output from a charging sensor 26 is input to the input unit 14. The charging sensor 26 detects a charging state of the battery 30. The charging state can be determined, based on a decreased state of a charging current or a charging period of time. For example, the charging sensor 26 outputs a signal indicating whether or not the battery 30 is in a fully charged state.

Here, a case where the charging sensor 26 outputs the signal indicating whether or not the battery 30 is in the fully charged state has been described as an example. However, the signal output from the charging sensor 26 may not indicate whether or not the battery 30 is in the fully charged state. For example, a signal indicating whether or not a residual battery amount shows a predetermined level or higher may be output from the charging sensor 26.

A signal output from an operation intention detection unit 28 is input to the input unit 14. For example, a camera 27 is connected to the operation intention detection unit 28. The camera 27 is arranged in the vehicle 36. The operation intention detection unit 28 determines whether or not a subject whose image is captured by the camera 27 has an intention to operate the opening-closing body 34, based on an image acquired by using the camera 27. The mason for using the operation intention detection unit 28 is that the operation detection unit 24 reacts in some cases even when the subject has no intention to operate the opening-closing body 34. For example, as illustrated in FIG. 4, when a passerby 53 passes by a lateral part of the vehicle 36, in spite of the fact that the subject has no intention to operate the opening-closing body 34, the operation detection unit 24 reacts. In addition, when the wind blows plants or laundry located near the vehicle 36, in spite of the fact that the subject has no intention to operate the opening-closing body 34, the operation detection unit 24 also reacts. For example, when eyes of a person imaged by the camera 27 are not oriented toward the operation detection unit 24, the operation intention detection unit 28 determines that the person has no intention to operate the opening-closing body 34. In addition, when a face of the person imaged by the camera 27 is not stationary, the operation intention detection unit 28 also determines that the person has no intention to operate the opening-closing body 34. In addition, when the subject imaged by the camera 27 is not a person, the operation intention detection unit 28 also determines that the subject has no intention to operate the opening-closing body 34. The operation intention detection unit 28 outputs a signal indicating whether or not the subject imaged by the camera 27 has an intention to operate the opening-closing body 34.

The operation intention detection unit 28 can be switched between a standby mode (power saving mode) requiring relatively less power consumption and a normal mode requiring relatively much power consumption. For example, when the operation detection signal output from the operation detection unit 24 exceeds a threshold Vth, the operation mode of the operation intention detection unit 28 can be switched from the standby mode to the normal mode.

Here, a case of using the operation intention detection unit 28 has been described as an example. However, the operation intention detection unit 28 may not be used. If the operation intention detection unit 28 is not used, this configuration can contribute to limited battery consumption.

In addition, a signal input from a rain sensor (rainfall sensor) 29 is input to the input unit 14. The rain sensor 29 detects whether or not the rain falls or whether a rainfall amount shows a predetermined value or greater. The reason for using the rain sensor 29 is that the operation detection unit 24 reacts in some cases although the subject has no intention to operate the opening-closing body 34 even when the rain fails so that the rainfall amount reaches a certain degree. For example, as the rain sensor 29, it is possible to use a raindrop sensor. The rain sensor 29 outputs a signal indicating whether or not the rain falls or whether the rain fall amount shows the predetermined value or greater. The rain sensor 29 can be switched between a standby mode (power saving mode) requiring relatively less power consumption and a normal mode requiring relatively much power consumption. For example, when the operation detection signal output from the operation detection unit 24 exceeds the threshold Vth, the operation mode of the rain sensor 29 can be switched from the standby mode to the normal mode.

Here, a case of using the rain sensor 29 has been described as an example. However, the rain sensor 29 may not be used. If the rain sensor 29 is not used, this configuration can contribute to limited battery consumption.

The control unit 16 performs an overall control of the control device 12. The control unit 16 reads the operation detection signal input from the operation detection unit 24 via the input unit 14. In addition, the control unit 16 reads the signal input from the ignition switch 25 via the Input unit 14. In addition, the control unit 16 reads the signal input from the charging sensor 26 via the input unit 14. In addition, the control unit 16 reads the signal input from the operation intention detection unit 28 via the input unit 14. In addition, the control unit 16 reads the signal input from the rain sensor 29 via the input unit 14.

The control unit 16 outputs a control signal (second signal, operation signal) for controlling an opening-closing body drive device 32 to the opening-closing body drive device 32 via the output unit 20. In other words, the control unit 16 outputs the operation signal (second signal) for operating the opening-closing body 34 by using the opening-closing body drive device 32 to the opening-closing body drive device 32 via the output unit 20. The opening-closing body drive device 32 drives the opening-closing body 34 which is a structural body having an opening-closing mechanism. The control unit 16 causes the opening-closing body 34 to automatically perform an opening operation via the opening-closing body drive device 32.

A rated power supply voltage of the control device 12 is 5 V, for example. Accordingly, an output of the battery 30 cannot be used as power supply of the control device 12 without any change. Therefore, power supply stepped down by using a DC/DC converter 31 is input to the control device 12. For example, as the DC/DC converter 31, a DC/DC converter whose rated input voltage is 12 V and rated output voltage is 5 V is used. The voltage of 12 V, for example, which is output from the battery 30 is stepped down to the voltage of 5 V, for example, by the DC/DC converter 31, and the stepped-down voltage is input to the control device 12.

The control device 12 according to the embodiment disclosed here can be switched from a normal mode (first power consumption mode) and a power saving mode (second power consumption mode) requiring less power consumption than the normal mode. When the operation detection signal output from the operation detection unit 24 shows the threshold Vth or smaller, the control unit 16 maintains the second power consumption mode. When the operation detection signal output from the operation detection unit 24 exceeds the threshold Vth, the control unit 16 switches the second power consumption mode to the first power consumption mode.

As described above, for example, multiple sensors (not illustrated) are incorporated in one operation detection unit 24. For example, in the second power consumption mode (power saving mode), only some sensors of the multiple sensors disposed inside one operation detection unit 24 are driven. In addition, in the second power consumption mode, the operation detection unit 24 is intermittently operated. Therefore, in the second power consumption mode, power consumption relatively decreases. On the other hand, in the first power consumption mode (normal mode), for example, all of the multiple sensors disposed inside one operation detection unit 24 are driven. In addition, in the first power consumption mode, the operation detection unit 24 is continuously operated. Therefore, in the first power consumption mode, power consumption relatively increases. In the first power consumption mode, the number of driven sensors increases. Moreover, since the operation detection unit 24 is continuously operated, detection accuracy is improved, compared to that in the second power consumption mode.

Figure 6A:
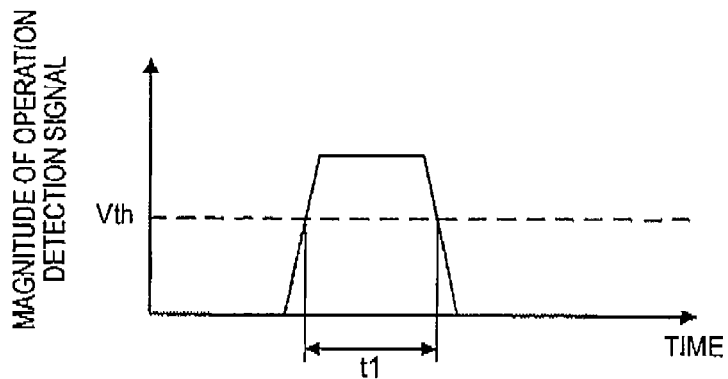

FIG. 6A is a view illustrating a case indicating that a state where the operation detection signal output from the operation detection unit 24 exceeds the threshold Vth is continued during time t1. When the state where the operation detection signal output from the operation detection unit 24 exceeds the threshold (threshold level) Vth is continued during a predetermined period of time (threshold period of time) Tth or a longer period of time, the control unit 16 determines to operate the opening-closing body 34. Time t1 is longer than a predetermined time Tth. Therefore, in a case as illustrated in FIG. 6A, it is determined to operate the opening-closing body 34. In this case, for example, an opening operation is performed on the opening-closing body 34.

Figure 6B:
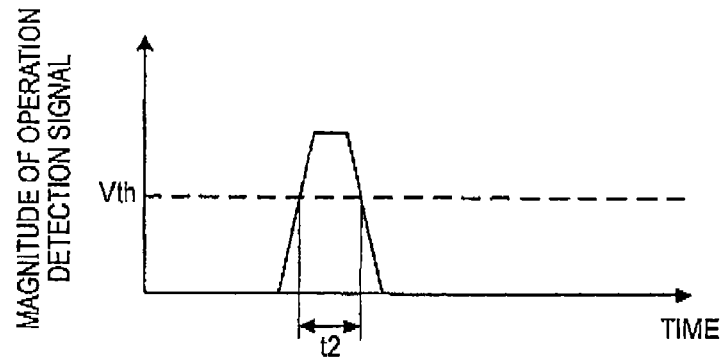

FIG. 6B is a view illustrating a case indicating that the state where the operation detection signal output from the operation detection unit 24 exceeds the threshold Vth is continued during time t2. Time t2 is equal to or shorter than time Tth. Therefore, in a case as illustrated in FIG. 6B, the opening-closing body 34 is not operated.

When the operation detection signal output from the operation detection unit 24 exceeds the threshold Vth, the control unit 16 switches the second power consumption mode (power saving mode) to the first power consumption mode (normal mode). The case where the operation detection signal output from the operation detection unit 24 exceeds the threshold Vth is not limited to a case where the occupant 52 who intends to operate the opening-closing body 34 performs the operation by using the portion of the body (refer to FIG. 2). For example, even when the passerby 53 passes by the lateral part of the vehicle 36 as illustrated in FIG. 4, a magnitude of the operation detection signal output from the operation detection unit 24 may exceed the threshold Vth. In addition, even when the wind blows plants or laundry located near the vehicle 36, the magnitude of the operation detection signal output from the operation detection unit 24 may exceed the threshold Vth. In addition, even when the rain falls so that the rainfall amount reaches a certain degree, the magnitude of the operation detection signal output from the operation detection unit 24 may exceed the threshold Vth. As described above, even when the occupant 52 has no intention to operate the opening-closing body 34, the operation detection signal output from the operation detection unit 24 may exceed the threshold Vth. When the operation detection signal output from the operation detection unit 24 exceeds the threshold Vth, the control unit 16 switches the second power consumption mode to the first power consumption mode. The power consumption in the first power consumption mode relatively increases as described above. Therefore, in spite of the fact that the occupant 52 has no intention to operate the opening-closing body 34, if the operation detection signal output from the operation detection unit 24 frequently exceeds the threshold Vth, total operation hours are lengthened in the first power consumption mode. If the total operation hours are lengthened in the first power consumption mode, not only the life of the battery 30 is significantly consumed, but also the battery 30 runs down.

Figure 7:
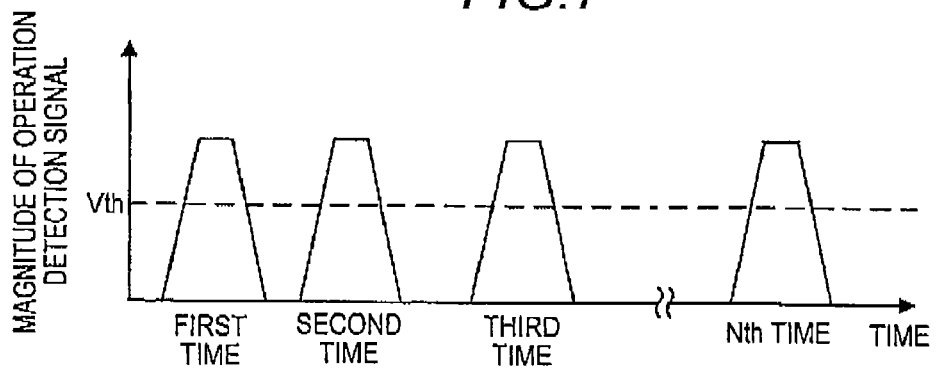
FIG. 7 is a time chart illustrating an example of the operation detection signal output from the operation detection unit.

FIG. 7 is a view illustrating a case indicating a repeated instance where the state where the operation detection signal output from the operation detection unit 24 exceeds the threshold Vth does not exceed the predetermined time Tth. In this case, since the state where the operation detection signal output from the operation detection unit 24 exceeds the threshold Vth does not exceed the predetermined time Tth, the operation detection signal does not lead to the operation (opening operation) of the opening-closing body 34. For example, when the passerby 53 frequently passes by the lateral part of the vehicle 36, the operation detection signal may vary as illustrated in FIG. 7. In addition, when the wind blows plants or laundry located near the vehicle 36, the operation detection signal may also vary as illustrated in FIG. 7. When the operation detection signal output from the operation detection unit 24 exceeds the threshold Vth, the second power consumption mode is switched to the first power consumption mode. Accordingly, in this case, total operation hours are lengthened in the first power consumption mode. If the total operation hours are lengthened in the first power consumption mode, not only the life of the battery 30 is significantly consumed, but also the battery 30 runs down.

Therefore, according to the embodiment disclosed here, when an instance where the state where the operation detection signal output from the operation detection unit 24 exceeds the threshold Vth does not exceed the predetermined time Tth is repeated N times (first number of instances), a condition for switching the second power consumption mode to the first power consumption mode is changed as follows. For example, a value of N can be set to approximately 6. However, without being limited thereto, the value can be appropriately set.

Figure 8:
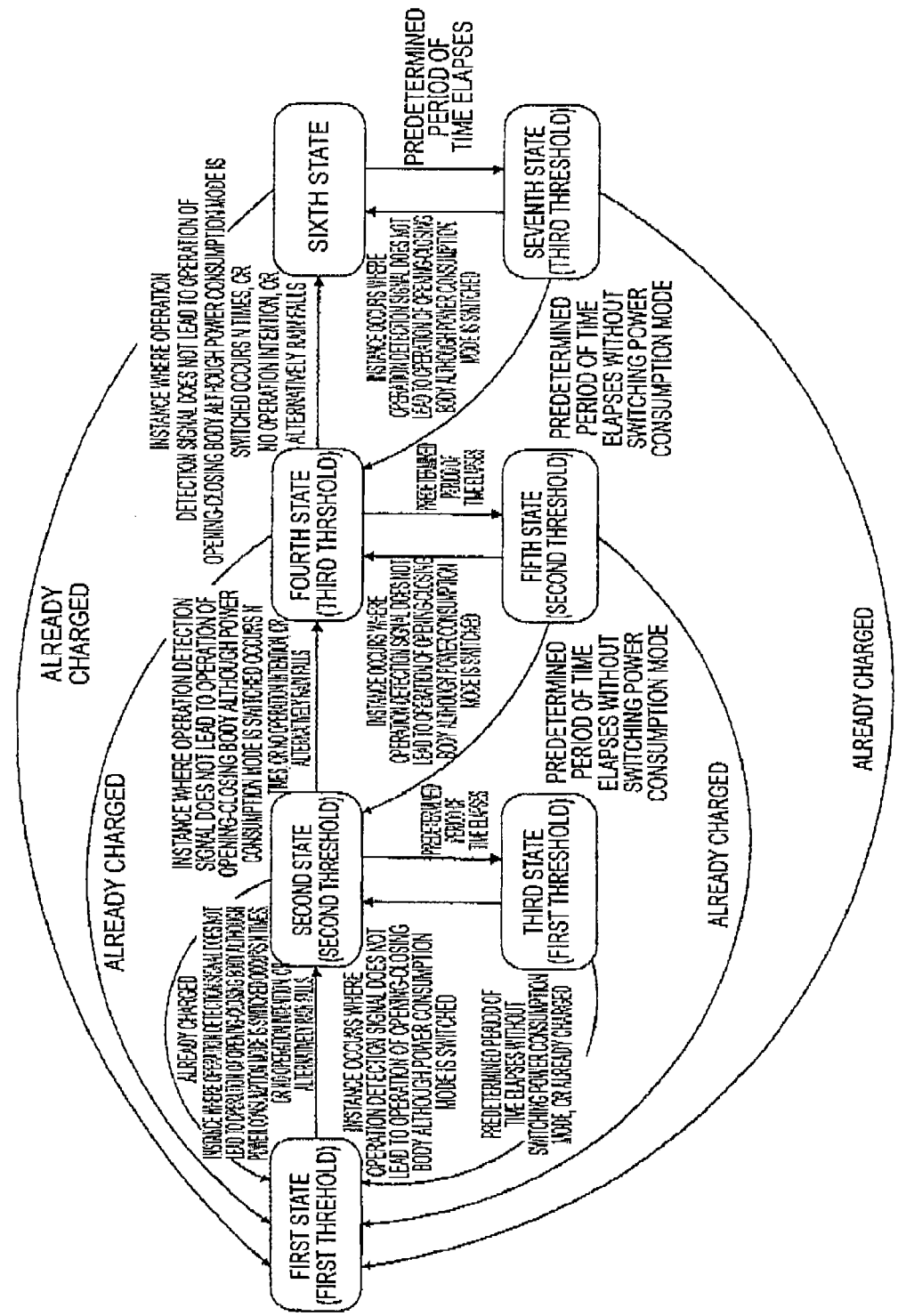
FIG. 8 is a state switching diagram of a control device according to the embodiment disclosed here.

FIG. 8 is a state switching diagram of the control device according to the embodiment disclosed here. As illustrated in FIG. 8, according to the embodiment disclosed here, a first state can be switched to a seventh state.

In the first state, the threshold of the operation detection signal output from the operation detection unit 24 is set to a first threshold Vth1. In the first state, based on a first condition, the second power consumption mode is switched to the first power consumption mode. The first condition means that the operation detection signal output from the operation detection unit 24 exceeds the first threshold Vth1. Therefore, in the first state, when the operation detection signal output from the operation detection unit 24 exceeds the first threshold Vth1, the second power consumption mode is switched to the first power consumption mode. The first threshold Vth1 is relatively low. In the first state, since the relatively low first threshold Vth1 is set, the second power consumption mode is relatively likely to be switched to the first power consumption mode.

In the second state, the threshold of the operation detection signal output from the operation detection unit 24 is set to a second threshold Vth2. In the second state, based on a second condition, the second power consumption mode is switched to the first power consumption mode. The second condition means that the operation detection signal output from the operation detection unit 24 exceeds the second threshold Vth2. Therefore, in the second state, when the operation detection signal output from the operation detection unit 24 exceeds the second threshold Vth2, the second power consumption mode is switched to the first power consumption mode. The second threshold Vth2 is higher than the first threshold Vth1. Therefore, on the second condition, the second power consumption mode is less likely to be switched to the first power consumption mode, compared to that on the first condition. As described above, in the second state, the second power consumption mode s less likely to be switched to the first power consumption mode, compared to that in the first state. Therefore, if the second state is set, it is possible to prevent the second power consumption mode from being switched to the first power consumption mode, in spite of the fact that the occupant 52 has no intention to operate the opening-closing body 34.

A third state is a tentative state. In the third state, based on the first condition, the second power consumption mode is switched to the first power consumption mode. As described above, on the first condition, the operation detection signal output from the operation detection unit 24 exceeds the first threshold Vth1. Therefore, in the third state, when the operation detection signal output from the operation detection unit 24 exceeds the first threshold Vth1, the second power consumption mode is switched to the first power consumption mode. The first threshold Vth1 is lower than the second threshold Vth2. Therefore, in the third state, the second power consumption mode is likely to be switched to the first power consumption mode, compared to that in the second state.

In a fourth state, the threshold of the operation detection signal output from the operation detection unit 24 is set to a third threshold Vth3. In the fourth state, based on a third condition, the second power consumption mode is switched to the first power consumption mode. The third condition means that the operation detection signal output from the operation detection unit 24 exceeds the third threshold Vth3. Therefore, in the fourth state, when the operation detection signal output from the operation detection unit 24 exceeds the third threshold Vth3, the second power consumption mode is switched to the first power consumption mode. The third threshold Vth3 is higher than the second threshold Vth2. Therefore, on the third condition, the second power consumption mode is less likely to be switched to the first power consumption mode, compared to that on the second condition. As described above, in the fourth state, the second power consumption mode is less likely to be switched to the first power consumption mode, compared to that in the second state. Therefore, if the fourth state is set, it is possible to further prevent the second power consumption mode from being switched to the first power consumption mode, in spite of the fact that the occupant 52 has no intention to operate the opening-closing body 34.

A fifth state is a tentative state. In the fifth state, based on the second condition, the second power consumption mode is switched to the first power consumption mode. As described above, on the second condition, the operation detection signal output from the operation detection unit 24 exceeds the second threshold Vth2. Therefore, in the fifth state, when the operation detection signal output from the operation detection unit 24 exceeds the second threshold Vth2, the second power consumption mode is switched to the first power consumption mode. The second threshold Vth2 is lower than the third threshold Vth3. Therefore, in the fifth state, the second power consumption mode is likely to be switched to the first power consumption mode, compared to that in the fourth state.

In a sixth state, the operation detection unit 24 is not operated. That is, in the sixth state, operation detection is not performed. Therefore, in the sixth state, the second power consumption mode is not switched to the first power consumption mode. If the sixth state is set, it is possible to reliably prevent the second power consumption mode from being switched to the first power consumption mode, in spite of the fact that the occupant 52 has no intention to operate the opening-closing body 34.

The sixth state is not limited to the above-described configuration. For example, in the sixth state, operation detection may be performed by setting the threshold of the operation detection signal output from the operation detection unit 24 to a fourth threshold Vth4 which is higher than the third threshold Vth3. When the threshold of the operation detection signal output from the operation detection unit 24 is set to the fourth threshold Vth4 which is higher than the third threshold Vth3, it is also possible to further prevent the second power consumption mode from being switched to the first power consumption mode, in spite of the fact that the occupant 52 has no intention to operate the opening-closing body 34.

A seventh state is a tentative state. In the seventh state, based on the third condition, the second power consumption mode is switched to the first power consumption mode. As described above, on the third condition, the operation detection signal output from the operation detection unit 24 exceeds the third threshold Vth3. Therefore, in the seventh state, when the operation detection signal output from the operation detection unit 24 exceeds the third threshold Vth3, the second power consumption mode is switched to the first power consumption mode.

When an instance where the operation detection signal does not lead to the operation of the opening-closing body 34 although the second power consumption mode is switched to the first power consumption mode is repeated N times (first number of instances) in the first state (refer to FIG. 7), the first state is switched to the second state. When the instance where the operation detection signal does not lead to the operation of the opening-closing body 34 although the second power consumption mode is switched to the first power consumption mode is repeated N times (first number of instances) in the second state, the second state is switched to the fourth state. When the instance where the operation detection signal does not lead to the operation of the opening-closing body 34 although the second power consumption mode is switched to the first power consumption mode is repeated N times (first number of instances) in the fourth state, the fourth state is switched to the sixth state. Here, a case where the switching is performed when a predetermined instance is repeated N times (first number of instances) has been described as an example. However, the number of repeated instances which is a switching condition is not limited to N times. When the instance where the operation detection signal does not lead to the operation of the opening-closing body 34 although the second power consumption mode is switched to the first power consumption mode s repeated N1 times in the first state, the first state may be switched to the second state. In addition, when the instance where the operation detection signal does not lead to the operation of the opening-closing body 34 although the second power consumption mode is switched to the first power consumption mode is repeated N2 times which are different from N1 times in the second state, the second state may be switched to the fourth state. In addition, when the instance where the operation detection signal does not lead to the operation of the opening-closing body 34 although the second power consumption mode is switched to the first power consumption mode is repeated N3 times which are different from N1 times and N2 times in the fourth state, the fourth state may be switched to the sixth state.

Whereas the operation detection signal does not lead to the operation of the opening-closing body 34 although the second power consumption mode is switched to the first power consumption mode, when it is detected in the first state that a person who reacts to the operation detection unit 24 has no intention to operate the opening-closing body 34, the first state is switched to the second state. In addition, whereas the operation detection signal does not lead to the operation of the opening-closing body 34 although the second power consumption mode is switched to the first power consumption mode, when it is detected in the second state that the person who reacts to the operation detection unit 24 has no intention to operate the opening-closing body 34, the second state is switched to the fourth state. In addition, whereas the operation detection signal does not lead to the operation of the opening-closing body 34 although the second power consumption mode is switched to the first power consumption mode, when it is detected in the fourth state that the person who reacts to the operation detection unit 24 has no intention to operate the opening-closing body 34, the fourth state is switched to the sixth state.

Whereas the operation detection signal does not lead to the operation of the opening-closing body 34 although the second power consumption mode is switched to the first power consumption mode, when it is detected in the first state that the rain falls so that the rainfall amount reaches a certain degree, the first state is switched to the second state. In addition, whereas the operation detection signal does not lead to the operation of the opening-closing body 34 although the second power consumption mode is switched to the first power consumption mode, when it is detected in the second state that the rain falls so that the rainfall amount reaches a certain degree, the second state is switched to the fourth state. In addition, whereas the operation detection signal does not lead to the operation of the opening-closing body 34 although the second power consumption mode is switched to the first power consumption mode, when it is detected in the fourth state that the rain falls so that the rainfall amount reaches a certain degree, the fourth state is switched to the sixth state.

When a predetermined time (first period of time) T1 elapses in the second state, the second state is switched to the third state. In addition, when the predetermined time (first period of time) T1 elapses in the fourth state, the fourth state is switched to the fifth state. In addition, when the predetermined time (first period of time) T1 elapses in the sixth state, the sixth state is switched to the seventh state. For example, the first period of time T1 can be set to approximately 10 minutes. However, without being limited thereto, the first period of time T1 can be appropriately set. Here, a case where switching is performed when the predetermined time T1 elapses has been described as an example. However, the elapsed time which is a switching condition is not limited to the same time T1. For example, when a predetermined time T11 elapses in the second state, the second state may be switched to the third state. In addition, when a predetermined time T12 which is different from the predetermined time T11 elapses in the fourth state, the fourth state may be switched to the fifth state. In addition, when a predetermined time T13 which is different from the predetermined times T11 and T12 elapses in the sixth state, the sixth state may be switched to the seventh state.

When a predetermined time (second period of time) T2 elapses in the third state without the second power consumption mode being switched to the first power consumption mode, the third state is switched to the first state. In addition, when the predetermined time (second period of time) T2 elapses in the fifth state without the second power consumption mode being switched to the first power consumption mode, the fifth state is switched to the second state. In addition, when the predetermined time (second period of time) T2 elapses in the seventh state without the second power consumption mode being switched to the first power consumption mode, the seventh state is switched to the fourth state. For example, the second period of time T2 can be set to approximately 10 minutes. However, without being limited thereto, the second period of time T2 can be appropriately set. Here, a case where switching is performed when the predetermined time T2 elapses has been described as an example. However, the elapsed time which is a switching condition is not limited to the same time T2. For example, when a predetermined time T21 elapses in the third state without the second power consumption mode being switched to the first power consumption mode, the third state may be switched to the first state. In addition, when a predetermined time T22 which is different from the predetermined time T21 elapses in the fifth state without the second power consumption mode being switched to the first power consumption mode, the fifth state may be switched to the second state. In addition, when a predetermined time T23 which is different from the predetermined times T21 and T22 elapses in the seventh state without the second power consumption mode being switched to the first power consumption mode, the seventh state may be switched to the fourth state.

When an instance where the operation detection signal does not lead to the operation of the opening-closing body 34 although the second power consumption mode is switched to the first power consumption mode occurs once in the third state, the third state is switched to the second state. In addition, when the instance where the operation detection signal does not lead to the operation of the opening-closing body 34 although the second power consumption mode is switched to the first power consumption mode occurs once in the fifth state, the fifth state is switched to the fourth state. In addition, when the instance where the operation detection signal does not lead to the operation of the opening-closing body 34 although the second power consumption mode is switched to the first power consumption mode occurs once in the seventh state, the seventh state is switched to the sixth state. Here, a case where switching is performed when the instance where the operation detection signal does not lead to the operation of the opening-closing body 34 occurs once has been described as an example. However, the number of instances where the operation detection signal does not lead to the operation of the opening-closing body 34, which is a switching condition, is not limited to once.

In addition, in the second state to the seventh state, when the battery 30 is fully charged, the states are switched to the first state.

Here, a case where the states are switched to the first state when the battery 30 is fully charged has been described, but the embodiment disclosed here is not limited to this configuration. For example, even in a stage before the battery 30 is fully charged, when the battery 30 is charged to reach at least a predetermined level, the states may be switched to the first state. In addition, when it is expected that the battery 30 is sufficiently charged, the states may be switched to the first state. For example, when a travelling time elapses to some extent, the states may be switched to the first state.

Next, an operation of the vehicle control system according to the embodiment disclosed here will be described with reference to FIGS. 2 to 4.

FIG. 2 is a perspective view illustrating a state where the occupant 52 performs an operation by using a portion of the body. Here, a case where the left front side door 34a is operated will be described as an example. When the left front side door 34a is operated, the occupant 52 holds his or her hand over the operation detection unit 24a arranged in the pillar section 40a of the side door 34a. When the hand of the occupant 52 is sufficiently close to the operation detection unit 24a, the operation detection signal output from the operation detection unit 24 exceeds the threshold Vth. If a state where the operation detection signal output from the operation detection unit 24 exceeds the threshold Vth exceeds the predetermined time Tth, the control unit 168 determines the operation so that the opening-closing body 34 is automatically open to reach a fully open position. FIG. 3 illustrates a state where the side door 34a performs an opening operation. Thereafter, the occupant 52 can get in the vehicle 36.

FIG. 4 illustrates a state where the passerby 53 passes by a lateral part of the vehicle 36. When the threshold Vth is relatively low, if a portion of the body of the passerby 53 is close to the operation detection unit 24a to some extent, the operation detection signal output from the operation detection unit 24 exceeds the threshold Vth. However, when the threshold Vth is relatively high, even if the portion of the body of the passerby 53 is close to the operation detection unit 24a to some extent, the operation detection signal output from the operation detection unit 24 does not exceed the threshold Vth. That is, in the first state, when the passerby 53 is close to the operation detection unit 24a to some extent, the second power consumption mode is likely to be switched to the first power consumption mode. However, in the second state, the second power consumption mode is less likely to be switched to the first power consumption mode. In the fourth state, even when the passerby 53 is close to the operation detection unit 24a to some extent, the second power consumption mode is much less likely to be switched to the first power consumption mode. In the sixth state, even when the passerby 53 is close to the operation detection unit 24a to some extent, the second power consumption mode is not switched to the first power consumption mode. Therefore, according to the embodiment disclosed here, total operation hours in the first power consumption mode can be shortened, and power consumption can be reduced. Therefore, according to the embodiment disclosed here, it is not only possible to prevent the life of the battery 30 from being consumed, but also possible to prevent the battery 30 from running down.

Next, a control method according to the embodiment disclosed here will be described with reference to FIGS. 9 to 15. FIGS. 9 to 15 are flowcharts illustrating the control method according to the embodiment disclosed here.

Figure 9:
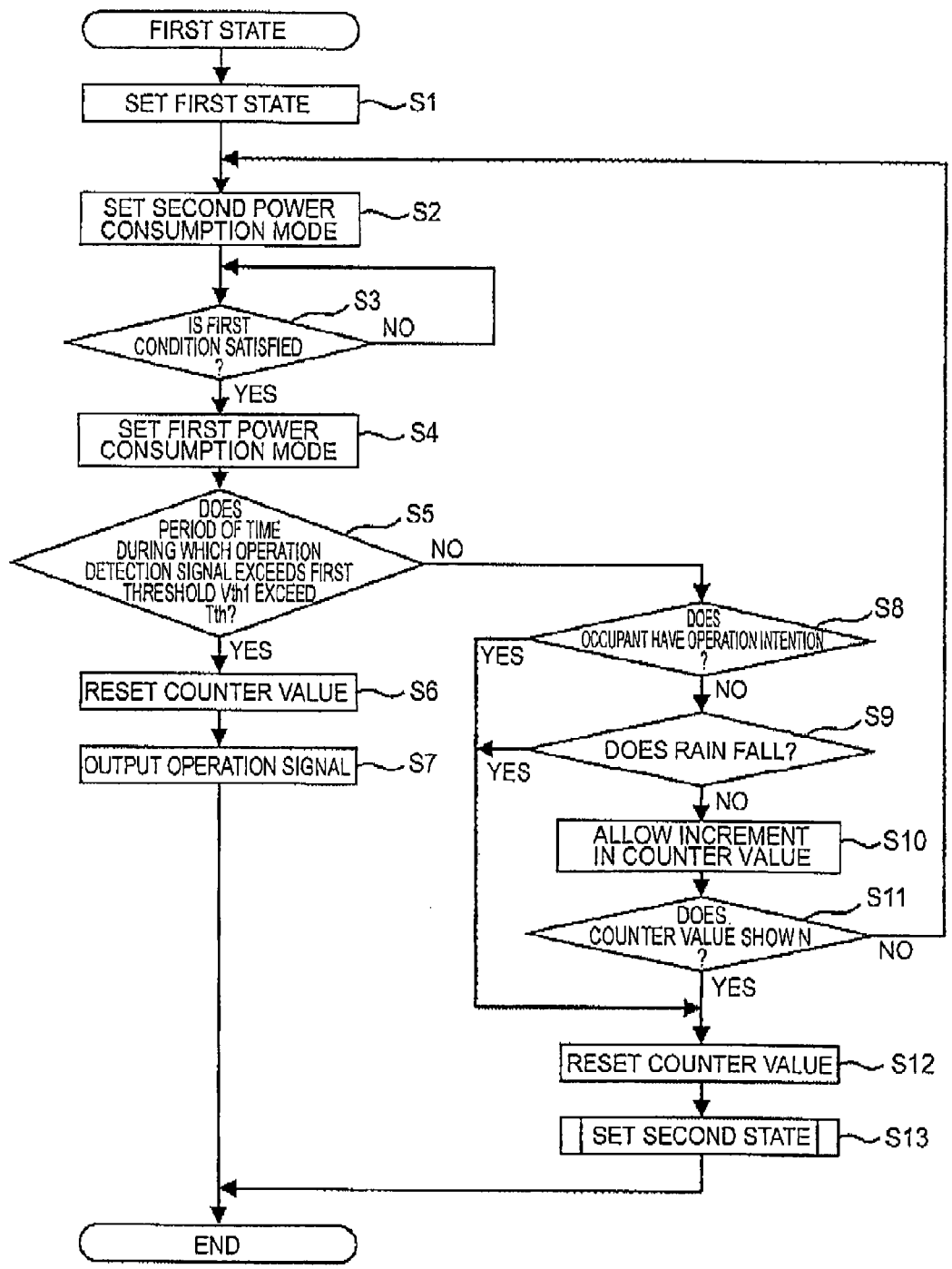
FIG. 9 is a flowchart illustrating a control method according to the embodiment disclosed here.

First, an operation in the first state will be described with reference to FIG. 9. First, the control unit 16 sets the first state (Step S1). In the first state, the second power consumption mode is switched to the first power consumption mode, based on the first condition. For example, on the first condition, the operation detection signal output from the operation detection unit 24 exceeds the first threshold Vth1.

Next, the control unit 16 sets the second power consumption mode (Step S2). As described above, for example, in the second power consumption mode, only some sensors of the multiple sensors disposed inside one operation detection unit 24 are driven. In addition, in the second power consumption mode, the operation detection unit 24 is intermittently operated. Therefore, in the second power consumption mode, relatively less power is consumed.

Next, when the first condition is satisfied (YES in Step S3), the control unit 16 switches the mode to the first power consumption mode (Step S4). As described above, on the first condition, the operation detection signal output from the operation detection unit 24 exceeds the first threshold Vth1. As described above, for example, in the first power consumption mode, all of the multiple sensors disposed inside one operation detection unit 24 are driven. In addition, in the first power consumption mode, the operation detection unit 24 is continuously operated. Therefore, in the first power consumption mode, power consumption relatively increases. In the first power consumption mode, the number of driven sensors increases. Alternatively, the operation detection unit 24 is continuously operated. Accordingly, compared to that in the second power consumption mode, detection accuracy is improved.

When the first condition is not satisfied (NO in Step S3), the control unit 16 does not switch the mode to the first power consumption mode, and repeatedly performs the process in Step S3.

Next, when a period of time during which the operation detection signal output from the operation detection unit 24 exceeds the first threshold Vth1 exceeds the predetermined time Tth (YES in Step S5), the control unit 16 resets a counter value for counting the number of instances where the operation detection signal output from the operation detection unit 24 exceeds the first threshold Vth1 (Step S6). Then, the control unit 16 outputs an operation signal for operating the opening-closing body 34 to the opening-closing body drive device 32 via the output unit 20 (Step S7). For example, the operation signal for operating the opening-closing body 34 is a signal for causing the opening-closing body 34 to perform an opening operation. Based on the operation signal, the opening-closing body drive device 32 causes the opening-closing body 34 to perform the opening operation.

When the period of time during which the operation detection signal output from the operation detection unit 24 exceeds the first threshold Vth1 is equal to or shorter than the predetermined time Tth (NO in Step S5), the process proceeds to Step S8. In Step S8, the control unit 18 determines whether or not a person who reacts to the operation detection unit 24 has an intention to operate the opening-closing body 34. When a signal output from the operation intention detection unit 28 indicates that the person who reacts to the operation detection unit 24 has no intention to operate the opening-closing body 34 (YES in Step S8), the control unit 16 resets the counter value for counting the number of instances where the operation detection signal output from the operation detection unit 24 exceeds the first threshold Vth1 (Step S12), and switches the state to the second state (Step S13).

Here, a case where the control unit 16 determines whether or not the person who reacts to the operation detection unit 24 has the intention to operate the opening-closing body 34 has been described as an example, but the embodiment disclosed here is not limited to this configuration. The control unit 16 may not determine whether or not the person who reacts to the operation detection unit 24 has the intention to operate the opening-closing body 34. In this case, the process in Step S8 is omitted.

When the control unit 18 does not determine that the person who reacts to the operation detection unit 24 has no intention to operate the opening-closing body 34 (NO in Step S8), the process proceeds to Step S9. In Step S9, the control unit 16 determines whether or not a rainfall amount (precipitation) is equal to or greater than a predetermined value. When a signal output from the rain sensor 29 indicates that the rainfall amount is equal to or greater than a predetermined amount (YES in Step S9), the control unit 16 resets the counter value for counting the number of instances where the operation detection signal output from the operation detection unit 24 exceeds the first threshold Vth1 (Step S12), and switches the state to the second state (Step S13).

Here, a case where the control unit 18 determines whether or not the rainfall amount is equal to or greater than the predetermined value has been described as an example, but the embodiment disclosed here is not limited to this configuration. The control unit 16 may not determine whether or not the rainfall amount is equal to or greater than the predetermined value. In this case, the process in Step S9 is omitted.

When the control unit 16 determines that the rainfall amount is not equal to or greater than the predetermined value (NO in Step S9), the control unit 16 allows an increment in the counter value for counting the number of instances where the operation detection signal output from the operation detection unit 24 exceeds the first threshold Vth1 (Step S10).

Next, the control unit 16 determines whether or not the counter value for counting the number of instances where the operation detection signal output from the operation detection unit 24 exceeds the first threshold Vth1 passes a predetermined value N (Step S11). When the counter value does not reach the predetermined value N (NO in Step S11), the processes subsequent to Step S2 are repeatedly performed. On the other hand, when the counter value reaches the predetermined value N (YES in Step S11), the control unit 16 resets the counter value (Step S12), and switches the state to the second state (Step S13).

Figure 10:
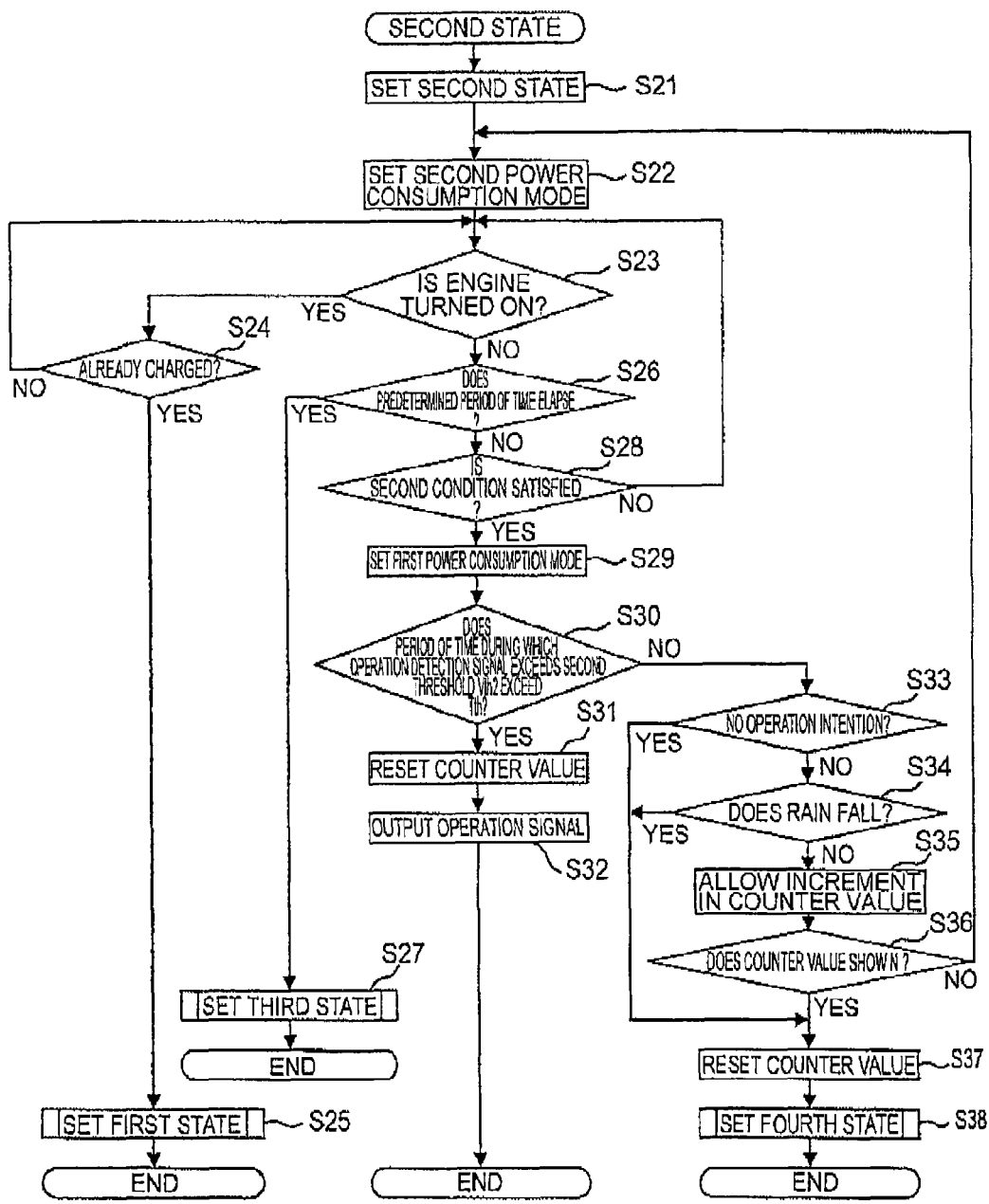
FIG. 10 is a flowchart illustrating the control method according to the embodiment disclosed here.

Next, an operation in the second state will be described with reference to FIG. 10. First, the control unit 16 of the control device 12 sets the second state (Step S21). In the second state, the second power consumption mode is switched to the first power consumption mode, based on the second condition. For example, on the second condition, the operation detection signal output from the operation detection unit 24 exceeds the second threshold Vth2.

Next, the control unit 16 sets the second power consumption mode (Step S22). As described above, for example, in the second power consumption mode, only some sensors of the multiple sensors disposed inside one operation detection unit 24 are driven. In addition, in the second power consumption mode, the operation detection unit 24 is intermittently operated. Therefore, in the second power consumption mode, power is relatively less consumed.

Next, an ON/OFF state of the engine is detected (Step S23). In a case where the engine is turned on (YES in Step S23), when the control unit 18 determines that the battery is in a sufficiently charged state (YES in Step S24), the control unit 16 switches the state to the first state (Step S25). When the control unit 16 determines that the battery is not in the sufficiently charged state (NO in Step S24), the process returns to Step S23.

When the engine is turned off (NO in Step S23), the control unit 16 determines whether or not an elapsed period of time from when the state is switched to the second state passes a predetermined time (Step S26). When the elapsed period of time from when the state is switched to the second state passes the predetermined time (YES in Step S26), the state is switched to the third state (Step S27).

When the elapsed period of time from when the state is switched to the second state is equal to or shorter than the predetermined time (NO in Step S26), the control unit 16 determines whether or not the second condition is satisfied (Step S28). When the second condition is satisfied (YES in Step S28), the control unit 16 switches the mode to the first power consumption mode (Step S29). As described above, on the second condition, the operation detection signal output from the operation detection unit 24 exceeds the second threshold Vth2. As described above, for example, in the first power consumption mode, all of the multiple sensors disposed inside one operation detection unit 24 are driven. In addition, in the first power consumption mode, the operation detection unit 24 is continuously operated. Therefore, in the first power consumption mode, power consumption relatively increases. In the first power consumption mode, the number of driven sensors increases. Alternatively, the operation detection unit 24 is continuously operated. Accordingly, compared to that in the second power consumption mode, detection accuracy is improved.

When the second condition is not satisfied (NO in Step S28), the control unit 16 does not switch the mode to the first power consumption mode, and the process returns to Step S23.

Next, when a period of time during which the operation detection signal output from the operation detection unit 24 exceeds the second threshold Vth2 exceeds the predetermined time Tth (YES in Step S30), the control unit 16 resets the counter value for counting the number of instances where the operation detection signal output from the operation detection unit 24 exceeds the second threshold Vth2 (Step S31). Then, the control unit 16 outputs the operation signal for operating the opening-closing body 34 to the opening-closing body drive device 32 via the output unit 20 (Step S32). Based on the operation signal, the opening-closing body drive device 32 causes the opening-closing body 34 to perform the opening operation.

Next, when the period of time during which the operation detection signal output from the operation detection unit 24 exceeds the second threshold Vth2 is equal to or shorter than the predetermined time Tth (NO in Step S30), the process proceeds to Step S33. In Step S33, the control unit 16 determines whether or not the person who reacts to the operation detection unit 24 has the intention to operate the opening-closing body 34. When a signal output from the operation intention detection unit 28 indicates that the person who reacts to the operation detection unit 24 has no intention to operate the opening-closing body 34 (YES in Step S33), the control unit 16 resets the counter value for counting the number of instances where the operation detection signal output from the operation detection unit 24 exceeds the second threshold Vth2 (Step S37), and switches the state to the fourth state (Step S38).

Here, a case where the control unit 16 determines whether or not the person who reacts to the operation detection unit 24 has the intention to operate the opening-closing body 34 has been described as an example, but the embodiment disclosed here is not limited to this configuration. The control unit 16 may not determine whether or not the person who reacts to the operation detection unit 24 has the intention to operate the opening-closing body 34. In this case, the process in Step S33 is omitted.

When the control unit 16 does not determine that the person who reacts to the operation detection unit 24 has no intention to operate the opening-closing body 34 (NO in Step S33), the process proceeds to Step S34. In Step S34, the control unit 16 determines whether or not the rainfall amount is equal to or greater than the predetermined value. When a signal output from the rain sensor 29 indicates that the rainfall amount is equal to or greater than the predetermined value (YES in Step S34), the control unit 16 resets the counter value for counting the number of instances where the operation detection signal output from the operation detection unit 24 exceeds the second threshold Vth2 (Step S37), and switches the state to the fourth state (Step S38).

Here, a case of detecting whether or not the rainfall amount is equal to or greater than the predetermined value has been described as an example, but the embodiment disclosed here is not limited to this configuration. The control unit 16 may not determine whether or not the rainfall amount is equal to or greater than the predetermined value. In this case, the process in Step S34 is omitted.

When the control unit 16 determines that the rainfall amount is not equal to or greater than the predetermined value (NO in Step S34), the control unit 18 allows an increment in the counter value for counting the number of instances where the operation detection signal output from the operation detection unit 24 exceeds the second threshold Vth2 (Step S35).

Next, the control unit 16 determines whether or not the counter value for counting the number of instances where the operation detection signal output from the operation detection unit 24 exceeds the second threshold Vth2 is the predetermined value N (Step S36). When the counter value does not reach the predetermined value N (NO in Step S36), the processes subsequent to Step S22 are repeatedly performed. On the other hand, when the counter value reaches the predetermined value N (YES in Step S36), the control unit 16 resets the counter value (Step S37), and switches the state to the fourth state (Step S38).

Figure 11:
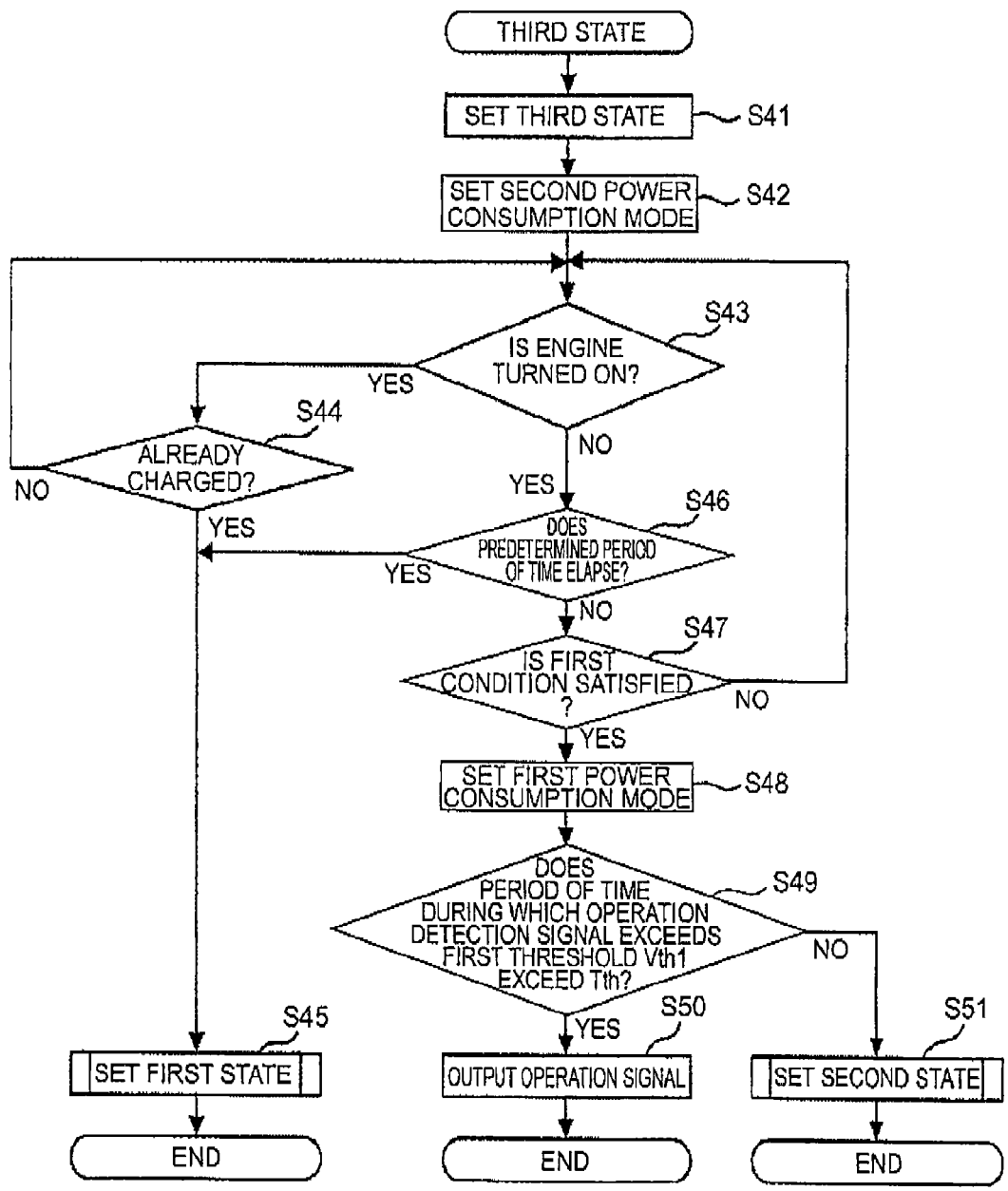
FIG. 11 is a flowchart illustrating the control method according to the embodiment disclosed here.

Next, an operation in the third state will be described with reference to FIG. 11. As described above, the third state is a tentative state. First, the control unit 16 of the control device 12 sets the third state (Step S41). In the third state, the second power consumption mode is switched to the first power consumption mode, based on the first condition. For example, as described above, on the first condition, the operation detection signal output from the operation detection unit 24 exceeds the first threshold Vth1.

Next, the control unit 16 sets the second power consumption mode (Step S42).

Next, an ON/OFF state of the engine is detected (Step S43). In a case where the engine is turned on (YES in Step S43), when the control unit 16 determines that the battery is in a sufficiently charged state (YES in Step S44), the control unit 16 switches the state to the first state (Step S45). When the control unit 16 determines that the battery is not in the sufficiently charged state (NO in Step S44), the process returns to Step S43.

When the engine is turned off (NO in Step S43), the control unit 16 determines whether or not an elapsed period of time from when the state is switched to the third state passes a predetermined time (Step S46). When the elapsed period of time from when the state is switched to the third state passes the predetermined time (YES in Step S46), the state is switched to the first state (Step S45).

When the elapsed period of time from when the state is switched to the third state is equal to or shorter than the predetermined time (NO in Step S46), the control unit 16 determines whether or not the first condition is satisfied (Step S47). When the first condition is satisfied (YES in Step S47), the control unit 16 switches the mode to the first power consumption mode (Step S48). As described above, on the first condition, the operation detection signal output from the operation detection unit 24 exceeds the first threshold Vth1.

When the first condition is not satisfied (NO in Step S47), the control unit 16 does not switch the mode to the first power consumption mode, and the process returns to Step S43.

Next, when a period of time during which the operation detection signal output from the operation detection unit 24 exceeds the first threshold Vth1 exceeds the predetermined time Tth (YES in Step S49), the control unit 16 outputs the operation signal for operating the opening-closing body 34 to the opening-closing body drive device 32 via the output unit 20 (Step S50). Based on the operation signal, the opening-closing body drive device 32 causes the opening-closing body 34 to perform the opening operation.

Next, when the period of time during which the operation detection signal output from the operation detection unit 24 exceeds the first threshold Vth1 is equal to or shorter than the predetermined time Tth (NO in Step S49), the control unit 16 switches the state to the second state (Step S51). Here, a case where the state is switched to the second state immediately when the period of time during which the operation detection signal output from the operation detection unit 24 exceeds the first threshold Vth1 is equal to or shorter than the predetermined time Tth has been described as an example, but the embodiment disclosed here is not limited to this configuration. For example, when an instance where the period of time during which the operation detection signal output from the operation detection unit 24 exceeds the first threshold Vth1 is equal to or shorter than the predetermined time Tth occurs a predetermined number of times or more frequently, the state may be switched to the second state.

Figure 12:
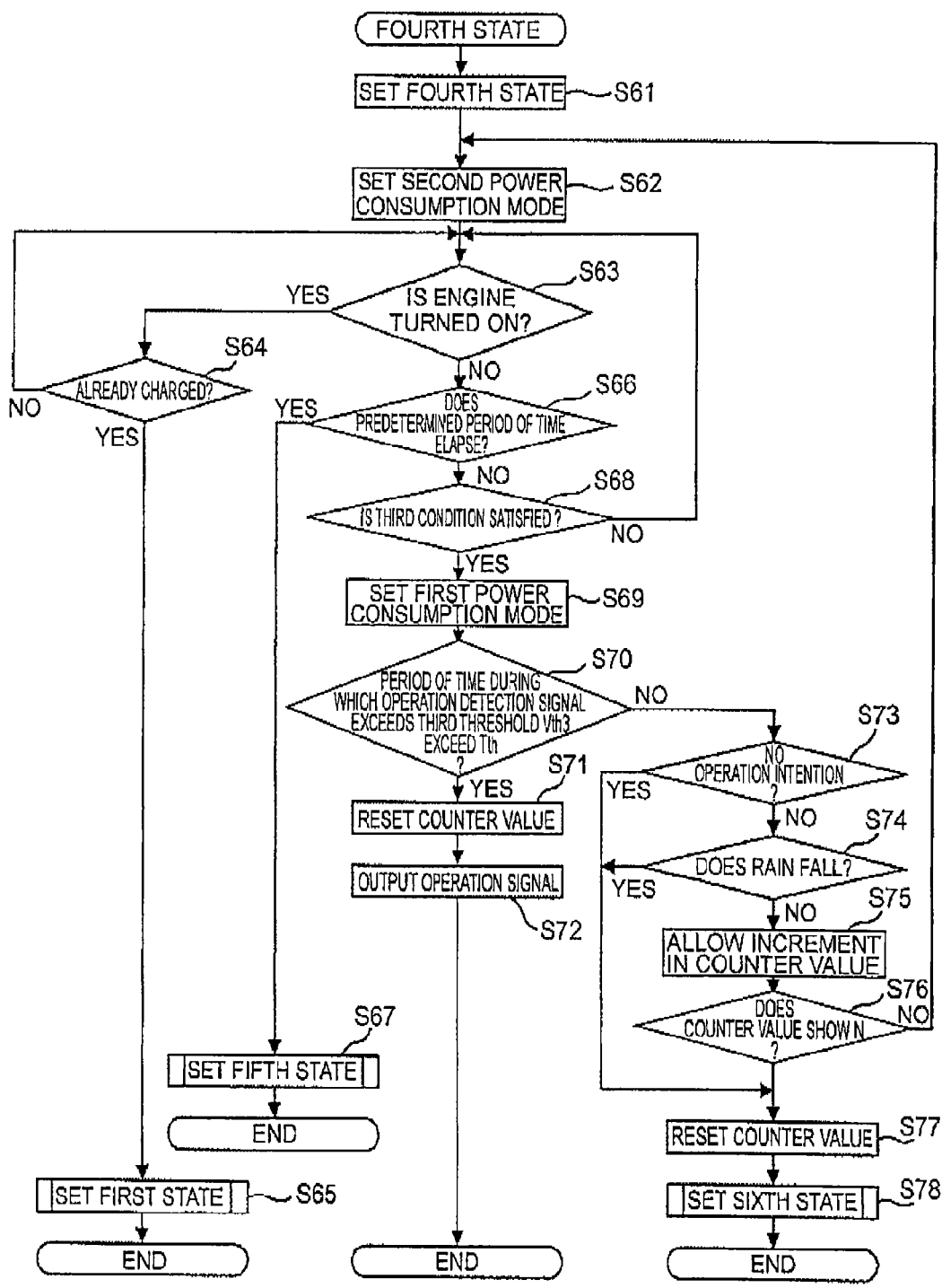
FIG. 12 is a flowchart illustrating the control method according to the embodiment disclosed here.

Next, an operation in the fourth state will be described with reference to FIG. 12. First, the control unit 16 of the control device 12 sets the fourth state (Step S61). In the fourth state, the second power consumption mode is switched to the first power consumption made, based on the third condition. For example, on the third condition, the operation detection signal output from the operation detection unit 24 exceeds the third threshold Vth3.

Next, the control unit 16 sets the second power consumption mode (Step S62).

Next, an ON/OFF state of the engine is detected (Step S63). In a case where the engine is turned on (YES in Step S63), when the control unit 16 determines that the battery is in a sufficiently charged state (YES in Step S64), the control unit 16 switches the state to the first state (Step S65). When the control unit 16 determines that the battery is not in the sufficiently charged state (NO in Step S64), the process returns to Step S63.

When the engine is turned off (NO in Step S63), the control unit 16 determines whether or not an elapsed period of time from when the state is switched to the fourth state passes a predetermined time (Step S66). When the elapsed period of time from when the state is switched to the fourth state passes the predetermined time (YES in Step S66), the state is switched to the fifth state (Step S87).

When the elapsed period of time from when the state is switched to the fourth state is equal to or shorter than the predetermined time (NO in Step S66), the control unit 16 determines whether or not the third condition is satisfied (Step S68). When the third condition is satisfied (YES in Step S68), the control unit 16 switches the mode to the first power consumption mode (Step S69). As described above, on the third condition, the operation detection signal output from the operation detection unit 24 exceeds the third threshold Vth3.

When the third condition is not satisfied (NO in Step S68), the control unit 16 does not switch the mode to the first power consumption mode, and the process returns to Step S63.

Next, when a period of time during which the operation detection signal output from the operation detection unit 24 exceeds the third threshold Vth3 exceeds the predetermined time Tth (YES in Step S70), the control unit 16 resets the counter value for counting the number of instances where the operation detection signal output from the operation detection unit 24 exceeds the third threshold Vth3 (Step S71). Then, the control unit 16 outputs the operation signal for operating the opening-closing body 34 to the opening-closing body drive device 32 via the output unit 20 (Step S72). Based on the operation signal, the opening-closing body drive device 32 causes the opening-closing body 34 to perform the opening operation.

Next, when the period of time during which the operation detection signal output from the operation detection unit 24 exceeds the third threshold Vth3 is equal to or shorter than the predetermined time Tth (NO in Step S70), the process proceeds to Step S73. In Step S73, the control unit 18 determines whether or not the person who reacts to the operation detection unit 24 has the intention to operate the opening-closing body 34. When a signal output from the operation intention detection unit 28 indicates that the person who reacts to the operation detection unit 24 has no intention to operate the opening-closing body 34 (YES in Step S73), the control unit 16 resets the counter value for counting the number of instances where the operation detection signal output from the operation detection unit 24 exceeds the third threshold Vth3 (Step S77), and switches the state to the sixth state (Step S78).

Here, a case where the control unit 16 determines whether or not the person who reacts to the operation detection unit 24 has the intention to operate the opening-closing body 34 has been described as an example, but the embodiment disclosed here is not limited to this configuration. The control unit 16 may not determine whether or not the person who reacts to the operation detection unit 24 has the intention to operate the opening-closing body 34. In this case, the process in Step S73 is omitted.

When the control unit 16 does not determine that the person who reacts to the operation detection unit 24 has no intention to operate the opening-closing body 34 (NO in Step S73), the process proceeds to Step S74. In Step S74, the control unit 16 determines whether or not the rainfall amount is equal to or greater than the predetermined value. When a signal output from the rain sensor 29 indicates that the rainfall amount is equal to or greater than the predetermined value (YES in Step S74), the control unit 16 resets the counter value for counting the number of instances where the operation detection signal output from the operation detection unit 24 exceeds the second threshold Vth2 (Step S77), and switches the state to the sixth state (Step S78).

Here, a case where the control unit 16 determines whether or not the rainfall amount is equal to or greater than the predetermined value has been described as an example, but the embodiment disclosed here is not limited to this configuration. The control unit 18 may not determine whether or not the rainfall amount is equal to or greater than the predetermined value. In this case, the process in Step S74 is omitted.

When the control unit 18 determines that the rainfall amount is not equal to or greater than the predetermined value (NO in Step S74), the control unit 16 allows an increment in the counter value for counting the number of instances where the operation detection signal output from the operation detection unit 24 exceeds the second threshold Vth2 (Step S75).

Next, the control unit 16 determines whether or not the counter value for counting the number of instances where the operation detection signal output from the operation detection unit 24 exceeds the second threshold Vth2 is the predetermined value N (Step S78). When the counter value does not reach the predetermined value N (NO in Step S76), the processes subsequent to Step S62 are repeatedly performed. On the other hand, when the counter value reaches the predetermined value N (YES in Step S76), the control unit 16 resets the counter value (Step S77), and switches the state to the sixth state (Step S78).

Figure 13:
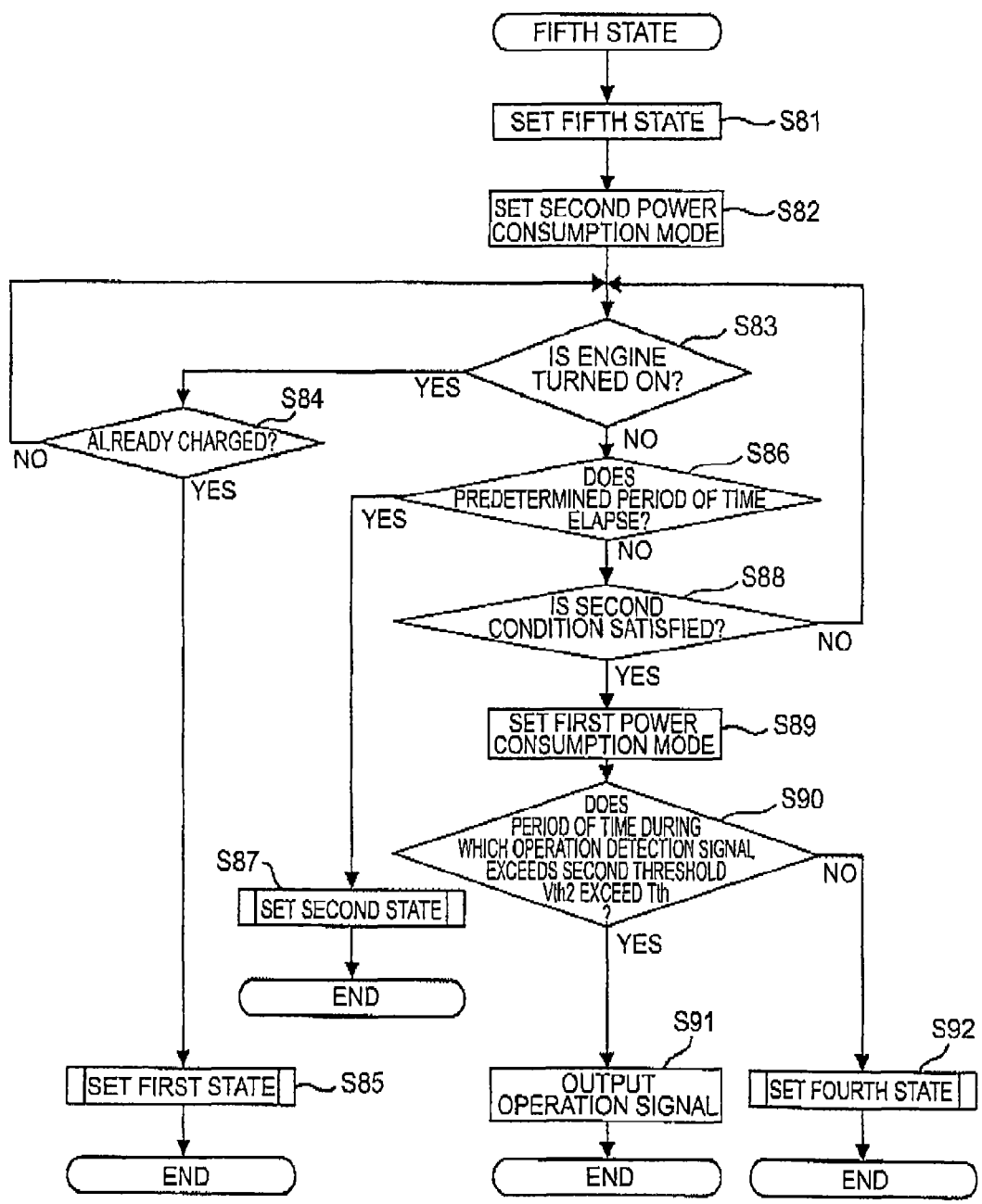
FIG. 13 is a flowchart illustrating the control method according to the embodiment disclosed here.

Next, an operation in the fifth state will be described with reference to FIG. 13. As described above, the fifth state is a tentative state. First, the control unit 16 of the control device 12 sets the fifth state (Step S81). In the fifth state, the second power consumption mode is switched to the first power consumption mode, based on the second condition. For example, as described above, on the second condition, the operation detection signal output from the operation detection unit 24 exceeds the second threshold Vth2.

Next, the control unit 18 sets the second power consumption mode (Step S82).

Next, an ON/OFF state of the engine is detected (Step S83). In a case where the engine is turned on (YES in Step S83), when the control unit 16 determines that the battery is in a sufficiently charged state (YES in Step S84), the control unit 16 switches the state to the first state (Step S85). When the control unit 16 determines that the battery is not in the sufficiently charged state (NO in Step S84), the process returns to Step S83.

When the engine is turned off (NO in Step S83), the control unit 16 determines whether or not an elapsed period of time from when the state is switched to the fifth state passes a predetermined time (Step S86). When the elapsed period of time from when the state is switched to the fifth state passes the predetermined time (YES in Step S88), the state is switched to the second state (Step S87).

When the elapsed period of time from when the state is switched to the fifth state is equal to or shorter than the predetermined time (NO in Step S86), the control unit 16 determines whether or not the second condition is satisfied (Step S88). When the second condition is satisfied (YES in Step S88), the control unit 16 switches the mode to the first power consumption mode (Step S89). As described above, on the second condition, the operation detection signal output from the operation detection unit 24 exceeds the second threshold Vth2.

When the second condition is not satisfied (NO in Step S88), the control unit 16 does not switch the mode to the first power consumption mode, and the process returns to Step S83.

Next, when a period of time during which the operation detection signal output from the operation detection unit 24 exceeds the second threshold Vth2 exceeds the predetermined time Tth (YES in Step S90), the control unit 18 outputs the operation signal for operating the opening-closing body 34 to the opening-closing body drive device 32 via the output unit 20 (Step S91). Based on the operation signal, the opening-closing body drive device 32 causes the opening-closing body 34 to perform the opening operation.

Next, when the period of time during which the operation detection signal output from the operation detection unit 24 exceeds the second threshold Vth2 is equal to or shorter than the predetermined time Tth (NO in Step S90), the state is switched to the fourth state (Step S92).

Figure 14:
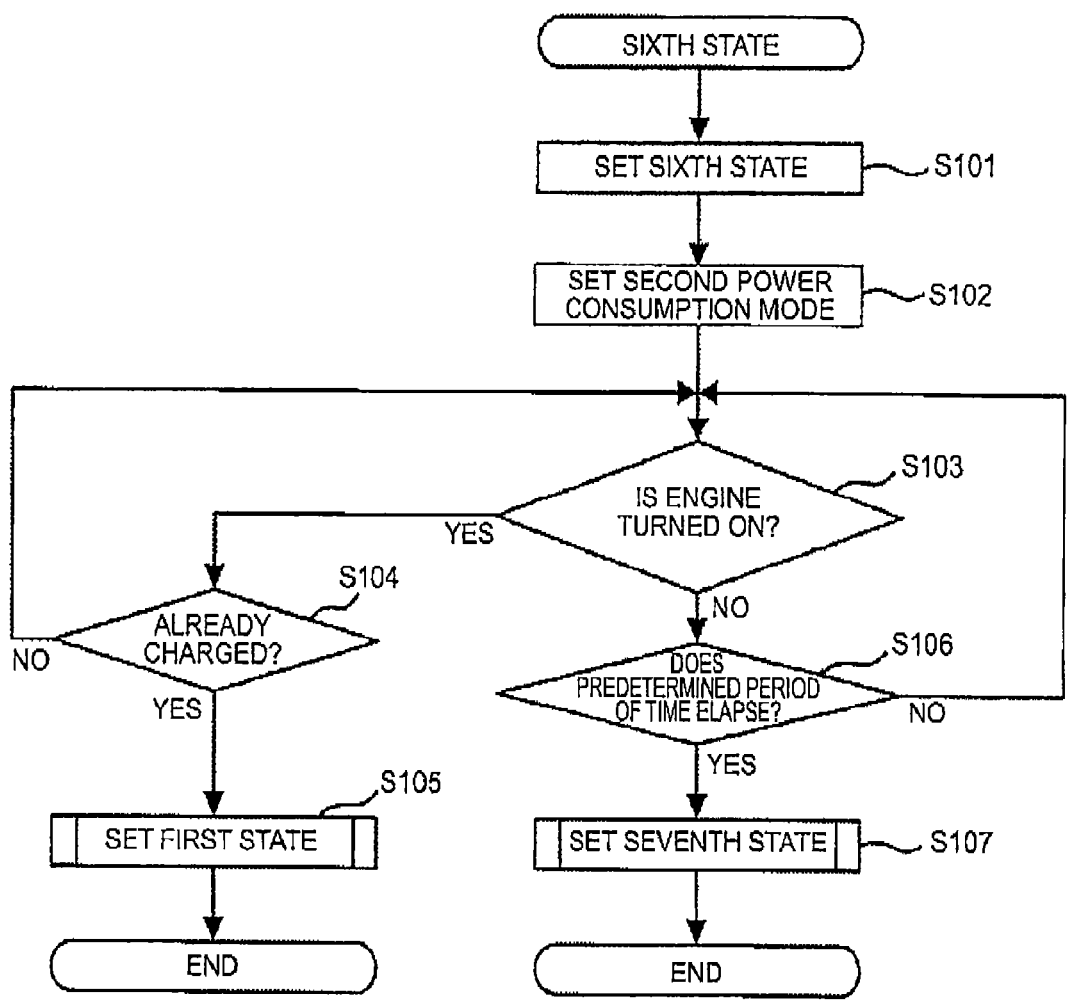
FIG. 14 is a flowchart illustrating the control method according to the embodiment disclosed here.

Next, an operation in the sixth state will be described with reference to FIG. 14. First, the control unit 16 of the control device 12 sets the sixth state (Step S101). In the sixth state, operation detection is not performed. Therefore, in the sixth state, the second power consumption mode is not switched to the first power consumption mode.

Next, the control unit 16 sets the second power consumption mode (Step S102).

Next, the control unit 16 detects an ON/OFF state of the engine (Step S103). In a case where the engine is turned on (YES in Step S103), when the control unit 16 determines that the battery is in a sufficiently charged state (YES in Step S104), the control unit 16 switches the state to the first state (Step S105). When the control unit 16 determines that the battery is not in the sufficiently charged state (NO in Step S104), the process returns to Step S103.

When the engine is turned off (NO in Step S103), the control unit 16 determines whether or not an elapsed period of time from when the state is switched to the sixth state passes a predetermined time (Step S106). When the elapsed period of time from when the state is switched to the sixth state is equal to or shorter than the predetermined time (NO in Step S106), the process returns to Step S103. When the elapsed period of time from when the state is switched to the sixth state passes the predetermined time (YES in Step S106), the state is switched to the seventh state (Step S107).

Figure 15:
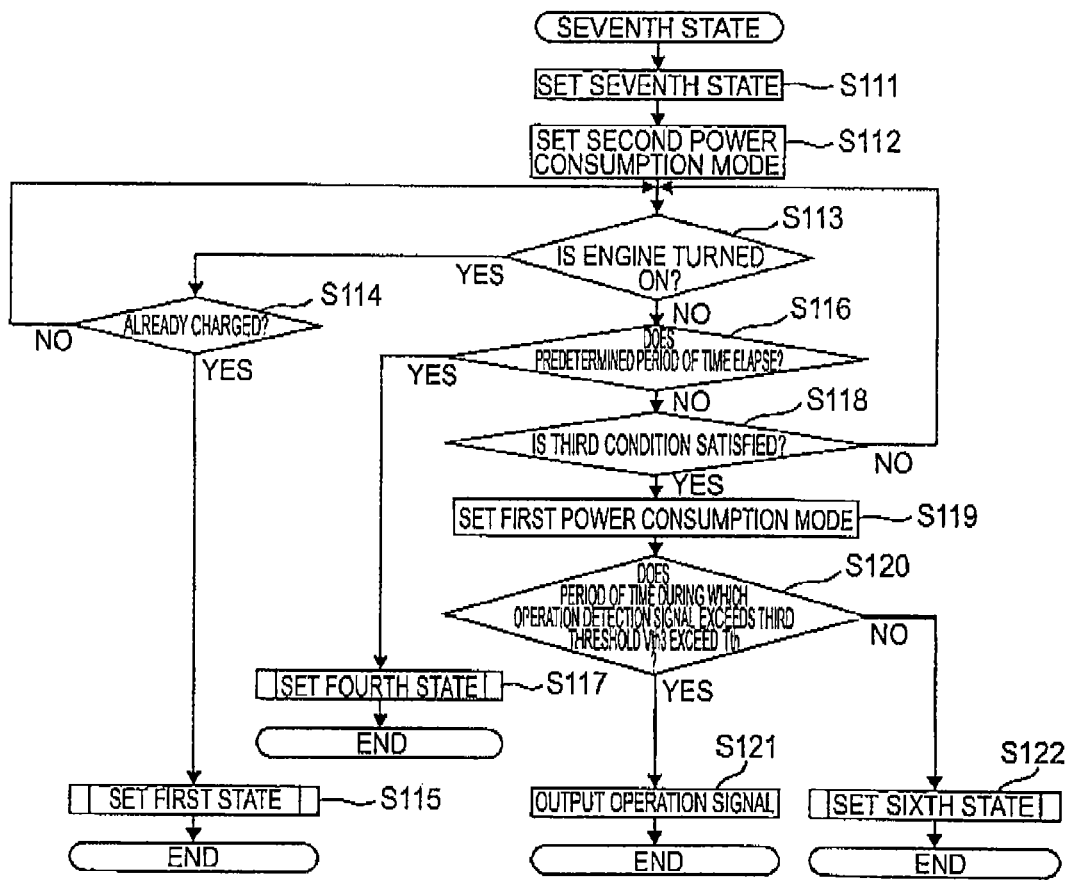
FIG. 15 is a flowchart illustrating the control method according to the embodiment disclosed here.

Next, an operation in the seventh state will be described with reference to FIG. 15. As described above, the seventh state is a tentative state. First, the control unit 16 of the control device 12 sets the seventh state (Step S111). In the seventh state, the second power consumption mode is switched to the first power consumption mode, based on the third condition. For example, as described above, on the third condition, the operation detection signal output from the operation detection unit 24 exceeds the third threshold Vth3.

Next, the control unit 16 sets the second power consumption mode (Step S112).

Next, an ON/OFF state of the engine is detected (Step S113). In a case where the engine is turned on (YES in Step S113), when the control unit 18 determines that the battery is in a sufficiently charged state (YES in Step S114), the control unit 16 switches the state to the first state (Step S115). When the control unit 16 determines that the battery is not in the sufficiently charged state (NO in Step S114), the process returns to Step S113.

When the engine is turned off (NO in Step S113), the control unit 18 determines whether or not an elapsed period of time from when the state is switched to the seventh state passes a predetermined time (Step S116). When the elapsed period of time from when the state is switched to the seventh state passes the predetermined time (YES in Step S116), the state is switched to the fourth state (Step S117).

When the elapsed period of time from when the state is switched to the seventh state is equal to or shorter than the predetermined time (NO in Step S116), the control unit 18 determines whether or not the third condition is satisfied (Step S118). When the third condition is satisfied (YES in Step S118), the control unit 16 switches the mode to the first power consumption mode (Step S119). As described above, on the third condition, the operation detection signal output from the operation detection unit 24 exceeds the third threshold Vth3.

When the third condition is not satisfied (NO in Step S118), the control unit 16 does not switch the mode to the first power consumption mode, and the process returns to Step S113.

Next, when a period of time during which the operation detection signal output from the operation detection unit 24 exceeds the third threshold Vth3 exceeds the predetermined time Tth (YES in Step S120), the control unit 16 outputs the operation signal for operating the opening-closing body 34 to the opening-closing body drive device 32 via the output unit 20 (Step S121). Based on the operation signal, the opening-closing body drive device 32 causes the opening-closing body 34 to perform the opening operation.

Next, when the period of time during which the operation detection signal output from the operation detection unit 24 exceeds the third threshold Vth3 is equal to or shorter than the predetermined time Tth (NO in Step S120), the state is switched to the sixth state (Step S122).

In this way, according to the embodiment disclosed here, conditions for switching the second power consumption mode to the first power consumption mode are appropriately changed. Therefore, it is not only possible to prevent the second power consumption mode from being unintentionally switched to the first power consumption mode, but also possible to prevent total operation hours from increasing in the first power consumption mode. Therefore, according to the embodiment disclosed here, power consumption can be reduced, and a battery can be prevented from running down.

Modification Example

Without being limited to the above-described embodiment, this disclosure can be modified in various ways.

For example, in the above-described embodiment, a case where the opening-closing body 34 is operated so as to perform the opening operation of the opening-closing body 34 has been described as an example, but this disclosure is not limited to this configuration. The opening-closing body 34 may be operated so as to perform a closing operation of the opening-closing body 34. In addition, the opening-closing body 34 may be operated by locking or unlocking the opening-closing body 34.

In addition, in the above-described embodiment, a case where the capacitance-type proximity sensor is used for the operation detection unit 24 has been described as an example. However, the sensor used for the operation detection unit 24 is not limited to the capacitance-type proximity sensor. For example, an infrared sensor or an ultrasonic sensor may be used for the operation detection unit 24.

In addition, in the above-described embodiment, a case where a single type sensor is used for the operation detection unit 24 has been described as an example. However, multiple types of sensors may be disposed inside the operation detection unit 24. For example, both a sensor whose detection accuracy is low but which requires relatively less power consumption and a sensor whose detection accuracy is high but which requires relatively much power consumption may be disposed inside the operation detection unit 24. For example, in the second power consumption mode (power saving mode), the sensor which requires relatively less power consumption may be driven. In the first power consumption mode (normal mode), the sensor which requires relatively much power consumption may be used.

In addition, in the above-described embodiment, a case where the raindrop sensor is used as the rain sensor 29 has been described as an example. However, the rain sensor 29 is not limited to the raindrop sensor. For example, based on weather information distributed from the internet, whether or not the rain falls may be determined, or the rainfall amount may be determined. In addition, based on information acquired by using the GPS, it may be determined whether or not the vehicle 36 is parked indoors. If the vehicle 36 is parked indoors, the vehicle 36 is hardly affected by the rainfall. Therefore, if the vehicle 36 is parked indoors, it is possible to estimate that a factor to which the operation detection unit 24 reacts is not the rainfall.

In addition, in the above-described embodiment, a case where the first state can be switched to the seventh state has been described as an example, but this disclosure is not limited to this configuration. The number of switching-available states may be smaller than 7, or may be greater than 7.

In addition, in the above-described embodiment, a condition that the operation detection signal output from the operation detection unit 24 exceeds the first threshold Vth1 is set to the first condition, and a condition that the operation detection signal output from the operation detection unit 24 exceeds the second threshold Vth2 is set to the second condition. However, this disclosure is not limited to this configuration. For example, a condition that the operation detection signal output from the operation detection unit 24 exceeds a third time T3 may be set to the first condition. Then, a condition that the operation detection signal output from the operation detection unit 24 exceeds a fourth time T4 which is longer than the third time T3 may be set to the second condition. For example, the third time T3 can be set to approximately one second. However, without being limited thereto, the third time T3 can be appropriately set. For example, the fourth time T4 can be set to approximately two seconds. However, without being limited thereto, the fourth time T4 can be appropriately set. In addition, a condition that the operation detection signal output from the operation detection unit 24 exceeds a fifth time T5 which is longer than the fourth time T4 may be set to the third condition. For example, the fifth time T5 can be set to approximately three seconds. However, without being limited thereto, the fifth time T5 can be appropriately set.

In addition, in the above-described embodiment, a condition that the operation detection signal output from the operation detection unit 24 exceeds the first threshold Vth1 is set to the first condition, and a condition that the operation detection signal output from the operation detection unit 24 exceeds the second threshold Vth2 is set to the second condition. However, this disclosure is not limited to this configuration. For example, a condition that a period of time during which the operation detection signal output from the operation detection unit 24 exceeds the first threshold Vth1 is longer than the third time T3 may be set to the first condition. Then, a condition that a period of time during which the operation detection signal output from the operation detection unit 24 exceeds the second threshold Vth2 is longer than the fourth time T4 may be set to the second condition. In addition, a condition that a period of time during which the operation detection signal output from the operation detection unit 24 exceeds the third threshold Vth3 is longer than the fifth time T5 may be set to the third condition.

Figure 16:
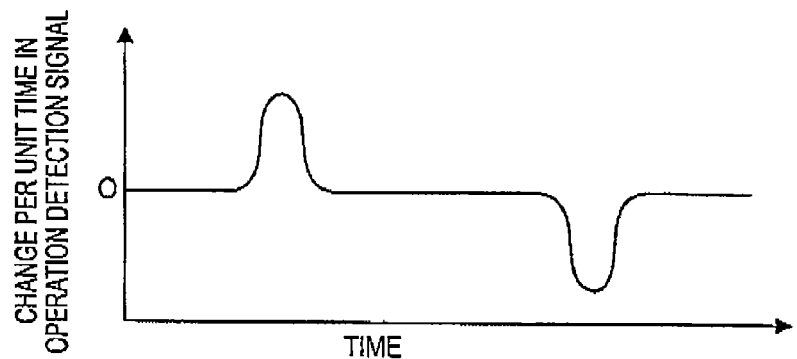
FIG. 16 is a time chart illustrating an example of the operation detection signal output from the operation detection unit.

In addition, in the above-described embodiment, the operation intention detection unit 28 is provided, but this disclosure is not limited to this configuration. For example, the presence or absence of the operation intention can also be determined, based on a waveform of the operation detection signal output from the operation detection unit 24. FIG. 16 is a time chart illustrating an example of the operation detection signal output from the operation detection unit 24. The horizontal axis represents the time, and the vertical axis represents a change per unit time in the operation detection signal, that s, acceleration of the operation detection signal. When a person is close to the operation detection unit 24, an increase rate per unit time in the operation detection signal becomes significantly higher. In addition, when the person is away from the operation detection unit 24, a decrease rate per unit time in the operation detection signal becomes significantly higher. On the other hand, when a person who has an operation intention is stationary in a state where a portion of the body is close to the operation detection unit 24, a change rate per unit time in the operation detection signal is stably in a low state. Therefore, when the change rate per unit time in the operation detection signal is high, it is possible to determine that the operation detection unit 24 reacts to a person who has no operation intention, or to an object. On the other hand, when the change rate per unit time in the operation detection signal is low, it is possible to determine that a person who has an operation intention causes the operation detection unit 24 to be operated. According to this determination manner, it is possible to determine the presence or absence of the operation intention without using the operation intention detection unit 28.

In addition, in the above-described embodiment, as illustrated in FIG. 8, the third state, the fifth state, and the seventh state are provided, but this disclosure is not limited to this configuration. For example, the third state, the fifth state, and the seventh state may not be provided. For example, the second state may be switched to the first state without passing through the third state. In this case, when a predetermined time elapses in the second state, the second state is switched to the first state. In addition, the fourth state may be switched to the second state without passing through the fifth state. In this case, when a predetermined time elapses in the fourth state, the fourth state is switched to the second state. In addition, the sixth state may be switched to the fourth state without passing through the seventh state. In this case, when a predetermined time elapses in the sixth state, the sixth state is switched to the fourth state.

In addition, in the above-described embodiment, a case where the opening-closing body 34 is automatically open to reach a fully open position has been described as an example. However, the opening-closing body 34 may be automatically open to have a predetermined opening degree without being open to reach the fully open position. In this case, after the opening-closing body 34 is open to have the predetermined opening degree, the occupant 52 manually further opens the opening-closing body 34. Therefore, in this case, it is preferable to set a site for arranging the operation detection unit 24 so as to enable the occupant to smoothly and manually further open the opening-closing body 34 after the opening-closing body 34 is automatically open to have the predetermined opening degree. According to the above-described embodiment, the operation detection unit 24 is arranged in a site which enables the occupant to smoothly and manually further open the opening-closing body 34 after the opening-closing body 34 is automatically open to have the predetermined opening degree. Therefore, after the doors 34a to 34c are automatically open to have a desired opening degree, the occupant can smoothly and manually further open the doors 34a to 34c. For example, after the side door 34a is automatically open to have a desired opening degree, the occupant 52 can smoothly further open the side door 34a by holding his or her hand over the pillar section 40a of the side door 34a. In addition, after the side door 34b is automatically open to have a desired opening degree, the occupant 52 can smoothly further open the side door 34b by holding his or her hand over the pillar section 40b of the side door 34b. In addition, after the backdoor 34c is automatically open to have a desired opening degree, the occupant 52 can smoothly further open the backdoor 34c by holding his or her hand over the lower end portion of the backdoor 34c.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A control device comprising:
an input unit to which a first signal is input from a detection unit which detects an operation for operating an opening-closing body; and
a control unit that generates a second signal for operating the opening-closing body, based on the first signal,
wherein the control unit is capable of being switched between a first power consumption mode and a second power consumption mode in which less power is consumed than in the first power consumption mode,
wherein the control unit is capable of being switched between a first state where the second power consumption mode is switched to the first power consumption mode, based on a first condition, and a second state where the second power consumption mode is switched to the first power consumption mode, based on a second condition on which the second power consumption mode is less likely to be switched to the first power consumption mode than on the first condition, and
wherein the control unit is switched from the first state to the second state, when in the first state, an instance where the opening-closing body is not operated occurs a first number of times although the second power consumption mode is switched to the first power consumption mode.

2. A control device comprising:
an input unit to which a first signal is input from a detection unit which detects an operation for operating an opening-closing body, and
a control unit that generates a second signal for operating the opening-closing body, based on the first signal,
wherein the control unit is capable of being switched between a first power consumption mode and a second power consumption mode in which less power is consumed than in the first power consumption mode,
wherein the control unit is capable of being switched between a first state where the second power consumption mode is switched to the first power consumption mode, based on a first condition, and a second state where the second power consumption mode is switched to the first power consumption mode, based on a second condition on which the second power consumption mode is less likely to be switched to the first power consumption mode than on the first condition, and
wherein the control unit is capable of being switched to a third state which is a tentative state where the second power consumption mode is switched to the first power consumption mode, based on the first condition.

3. The control device according to claim 2,
wherein the control unit is switched from the second state to the third state, when a first period of time elapses in the second state.

4. The control device according to claim 2,
wherein the control unit is switched from the third state to the second state, when in the third state, an instance where the opening-closing body is not operated occurs a second number of times although the second power consumption mode is switched to the first power consumption mode.

5. The control device according to claim 2,
wherein the control unit is switched from the third state to the first state, when in the third state, an instance where a second period of time elapses occurs a third number of times without the second power consumption mode being switched to the first power consumption mode.

6. The control device according to claim 1,
wherein the first condition is a condition that the first signal exceeds a first threshold, and wherein the second condition is a condition that the first signal exceeds a second threshold which is higher than the first threshold.

7. The control device according to claim 1,
wherein the first condition is a condition that the first signal exceeds a third period of time, and
wherein the second condition is a condition that the first signal exceeds a fourth period of time which is longer than the third period of time.

8. The control device according to claim 1,
wherein the first condition is a condition that a period of time while the first signal exceeds a first threshold is longer than a third period of time, and
wherein the second condition is a condition that a period of time while the first signal exceeds a second threshold is longer than a fourth period of time.

* * * * *